(12) United States Patent
Misra et al.

(10) Patent No.: US 12,238,320 B2
(45) Date of Patent: *Feb. 25, 2025

(54) NON-TRANSITORY COMPUTER-READABLE MEDIUM AND DEVICE FOR PERFORMING INTER PREDICTION IN VIDEO CODING

(71) Applicant: SHARP KABUSHIKI KAISHA, Sakai (JP)

(72) Inventors: Kiran Mukesh Misra, Vancouver, WA (US); Frank Bossen, Vancouver, WA (US); Christopher Andrew Segall, Vancouver, WA (US)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/203,188

(22) Filed: May 30, 2023

(65) Prior Publication Data
US 2023/0308675 A1  Sep. 28, 2023

Related U.S. Application Data

(63) Continuation of application No. 17/416,645, filed as application No. PCT/JP2019/049315 on Dec. 17, 2019, now Pat. No. 11,706,437.

(Continued)

(51) Int. Cl.
*H04N 19/46* (2014.01)
*H04N 19/105* (2014.01)
(Continued)

(52) U.S. Cl.
CPC ........... *H04N 19/46* (2014.11); *H04N 19/105* (2014.11); *H04N 19/159* (2014.11); *H04N 19/176* (2014.11); *H04N 19/70* (2014.11)

(58) Field of Classification Search
CPC .... H04N 19/46; H04N 19/105; H04N 19/159; H04N 19/176; H04N 19/70; H04N 19/44; H04N 19/52
See application file for complete search history.

(56) References Cited

U.S. PATENT DOCUMENTS

2015/0023422 A1    1/2015  Zhang et al.
2020/0021814 A1*   1/2020  Xu ..................... H04N 19/176
(Continued)

FOREIGN PATENT DOCUMENTS

CN    105493505 A    4/2016
CN    105637870 A    6/2016
(Continued)

OTHER PUBLICATIONS

International Standard, "Information technology—Coding of audio-visual objects—Part 2: Visual", ISO/IEC 14496-2:2001(E), Dec. 1, 2001.

(Continued)

*Primary Examiner* — Francis Geroleo
(74) *Attorney, Agent, or Firm* — ScienBiziP, P.C.

(57) ABSTRACT

A non-transitory computer-readable medium of a device storing computer-executable instructions is provided. When the instructions are executed by one or more processors of the device, the instructions cause the device to: decode a merge subblock flag that specifies whether subblock-based inter prediction parameters for a coding unit are inferred from neighboring blocks and that determines whether a motion vector difference merge flag and a combination flag are to be decoded; determine a value of the merge subblock flag; decode the motion vector difference merge flag after the value of the merge subblock flag is determined as being equal to zero and a value of a motion vector difference flag is determined as being equal to one; and decode the combination flag that specifies whether a combined inter-picture (Continued)

merge and intra-picture prediction is applied to the coding unit by using the merge subblock flag and a sequence parameter set (SPS) flag.

4 Claims, 8 Drawing Sheets

Related U.S. Application Data

(60) Provisional application No. 62/784,014, filed on Dec. 21, 2018.

(51) Int. Cl.
*H04N 19/159* (2014.01)
*H04N 19/176* (2014.01)
*H04N 19/70* (2014.01)

(56) References Cited

U.S. PATENT DOCUMENTS

| | | | | |
|---|---|---|---|---|
| 2020/0154101 | A1* | 5/2020 | Li | H04N 19/137 |
| 2020/0177873 | A1* | 6/2020 | Li | H04N 19/103 |
| 2021/0243476 | A1* | 8/2021 | Ko | H04N 19/176 |
| 2022/0078488 | A1* | 3/2022 | Leleannec | H04N 19/105 |

FOREIGN PATENT DOCUMENTS

| | | |
|---|---|---|
| CN | 107079161 A | 8/2017 |
| WO | 2015142057 A1 | 9/2015 |

OTHER PUBLICATIONS

Telecommunication Standardization Sector of ITU, "Advanced video coding for generic audiovisual services", Recommendation ITU-T H.264, (Apr. 2017).

Telecommunication Standardization Sector of ITU, "High efficiency video coding", Recommendation ITU-T H.265, (Feb. 2018).
Output document of JVET, "Algorithm Description of Joint Exploration Test Model 7 (JEM 7)", JVET-G1001-v1, Joint Video Exploration Team (JVET) of ITU-T SG 16 WP 3 and ISO/IEC JTC 1/SC 29/WG 11, 7th Meeting: Torino, IT, Jul. 13-21, 2017.
Output document approved by JVET, "Versatile Video Coding (Draft 1)", JVET-J1001-v2, Joint Video Experts Team (JVET) of ITU-T SG 16 WP 3 and ISO/IEC JTC 1/SC 29/WG 11, 10th Meeting: San Diego, US, Apr. 10-20, 2018.
Output document approved by JVET, "Versatile Video Coding (Draft 2)", JVET-K1001-v7, Joint Video Experts Team (JVET) of ITU-T SG 16 WP 3 and ISO/IEC JTC 1/SC 29/WG 11, 11th Meeting: Ljubljana, SI, Jul. 10-18, 2018.
Output document approved by JVET, "Versatile Video Coding (Draft 3)", JVET-L1001-v6, Joint Video Experts Team (JVET) of ITU-T SG 16 WP 3 and ISO/IEC JTC 1/SC 29/WG 11, 12th Meeting: Macao, CN, Oct. 3-12, 2018.
Non-Final Rejection dated Apr. 15, 2022 for U.S. Appl. No. 17/416,645 which is the parent application of the instant application.
Final Rejection dated Aug. 4, 2022 for U.S. Appl. No. 17/416,645 which is the parent application of the instant application.
Notice of Allowance dated Mar. 2, 2023 for U.S. Appl. No. 17/416,645 which is the parent application of the instant application.
Li Hao et al.: "A Motion Aided Merge Mode For Hevc", 2018 IEEE International Conference On Acoustics, Speech and Signal Processing (ICASSP), IEEE, Apr. 15, 2018 (Apr. 15, 2018).
Fu (Huawei), T et al.: "Non-CE4: separate merge candidate list for sub-block modes", JVET-K0364-v2, Joint Video Experts Team (JVET) of ITU-T SG 16 WP 3 and ISO/IEC JTC 1/SC 29/WG11, 11th Meeting: Ljubljana, SI, Jul. 10-18, 2018 (Jul. 10, 2018).
Fukushima (JK-Holdings), S et al.: "Merge based mvd transmission", JCTVC-F373, Joint Collaborative Team on Video Coding (JCT-VC) of ITU-T SG16 WP3 and ISO/IEC JTC1/SC29/WG11, 6th Meeting: Torino, IT, Jul. 14-22, 2011 (Jul. 6, 2011).

* cited by examiner

NON-TRANSITORY COMPUTER-READABLE MEDIUM AND DEVICE FOR PERFORMING INTER PREDICTION IN VIDEO CODING

CROSS-REFERENCE TO RELATED APPLICATION(S)

This application is a continuation application of U.S. patent application Ser. No. 17/416,645, filed on Jun. 21, 2021, now published as U.S. Publication No. 2022/0078460, which is a national stage application of International Patent Application No. PCT/JP2019/049315, filed on Dec. 17, 2019, now published as WO2020/129950, which claims the benefit of and priority to U.S. Provisional Patent Application Ser. No. 62/784,014, filed on Dec. 21, 2018. The contents of all of the above-mentioned applications are hereby incorporated herein fully by reference in their entirety.

TECHNICAL FIELD

This disclosure relates to video coding and, more particularly, to techniques for performing inter prediction.

BACKGROUND ART

Digital video capabilities can be incorporated into a wide range of devices, including digital televisions, laptop or desktop computers, tablet computers, digital recording devices, digital media players, video gaming devices, cellular telephones, including so-called smartphones, medical imaging devices, and the like. Digital video may be coded according to a video coding standard. Video coding standards may incorporate video compression techniques. Examples of video coding standards include ISO/IEC MPEG-4 Visual and ITU-T H.264 (also known as ISO/IEC MPEG-4 AVC) and High-Efficiency Video Coding (HEVC). HEVC is described in High-Efficiency Video Coding (HEVC), Rec. ITU-T H.265, December 2016, which is incorporated by reference, and referred to herein as ITU-T H.265. Extensions and improvements for ITU-T H.265 are currently being considered for the development of next generation video coding standards. For example, the ITU-T Video Coding Experts Group (VCEG) and ISO/IEC (Moving Picture Experts Group (MPEG) (collectively referred to as the Joint Video Exploration Team (JVET)) are studying the potential need for standardization of future video coding technology with a compression capability that significantly exceeds that of the current HEVC standard. The Joint Exploration Model 7 (JEM 7), Algorithm Description of Joint Exploration Test Model 7 (JEM 7), ISO/IEC JTC1/SC29/WG11 Document: JVET-G1001, July 2017, Torino, IT, which is incorporated by reference herein, describes the coding features under coordinated test model study by the JVET as potentially enhancing video coding technology beyond the capabilities of ITU-T H.265. It should be noted that the coding features of JEM 7 are implemented in JEM reference software. As used herein, the term JEM may collectively refer to algorithms included in JEM 7 and implementations of JEM reference software. Further, in response to a "Joint Call for Proposals on Video Compression with Capabilities beyond HEVC," jointly issued by VCEG and MPEG, multiple descriptions of video coding were proposed by various groups at the 10th Meeting of ISO/IEC JTC1/SC29/WG11 16-20 April 2018, San Diego, CA. As a result of the multiple descriptions of video coding, a draft text of a video coding specification is described in "Versatile Video Coding (VVC) (Draft 1)," 10th Meeting of ISO/IEC JTC1/SC29/WG11 16-20 April 2018, San Diego, CA, document JVET-J1001-v2, which is incorporated by reference herein, and referred to as JVET-J1001. "Versatile Video Coding (Draft 2)," 11th Meeting of ISO/IEC JTC1/SC29/WG11 10-18 Jul. 2018, Ljubljana, SI, document JVET-K1001-v7, which is incorporated by reference herein, and referred to as JVET-K1001, is an update to JVET-J1001. Further, "Versatile Video Coding (Draft 3)," 12th Meeting of ISO/IEC JTC1/SC29/WG11 3-12 Oct. 2018, Macao, CN, document JVET-L1001-v6, which is incorporated by reference herein, and referred to as JVET-L1001, is an update to JVET-K1001.

Video compression techniques enable data requirements for storing and transmitting video data to be reduced. Video compression techniques may reduce data requirements by exploiting the inherent redundancies in a video sequence. Video compression techniques may sub-divide a video sequence into successively smaller portions (e.g., groups of frames within a video sequence, a frame within a group of frames, regions within a frame, video blocks within a region, and sub-blocks within a video block). Intra prediction coding techniques (e.g., intra-picture (spatial)) and inter prediction techniques (e.g., inter-picture (temporal)) may be used to generate difference values between a unit of video data to be coded and a reference unit of video data. The difference values may be referred to as residual data. Residual data may be coded as quantized transform coefficients. Syntax elements may relate residual data and a reference coding unit (e.g., intra-prediction mode indices, motion vectors, and block vectors). Residual data and syntax elements may be entropy coded. Entropy encoded residual data and syntax elements may be included in a compliant bitstream. Compliant bitstreams and associated metadata may be formatted according to data structures.

SUMMARY OF INVENTION

In a first aspect of the present disclosure, a method of decoding video data is provided. The method includes: decoding a merge subblock flag specifying whether subblock-based inter prediction parameters for a coding unit are inferred from neighbouring blocks; and decoding a motion vector difference merge flag, if a value of the merge subblock flag is equal to zero and a value of a motion vector difference flag is equal to one, wherein the motion vector difference merge flag specifies a prediction parameter with a motion vector difference is used, and the motion vector difference flag specifies whether a merge mode with motion vector difference is enabled.

In a second aspect of the present disclosure, a method of coding video data is provided. The method includes: coding a merge subblock flag specifying whether subblock-based inter prediction parameters for a coding unit are inferred from neighbouring blocks; and coding a motion vector difference merge flag, if a value of the merge subblock flag is equal to zero and a value of a motion vector difference flag is equal to one, wherein the motion vector difference merge flag specifies a prediction parameter with a motion vector difference is used, and the motion vector difference flag specifies whether a merge mode with motion vector difference is enabled.

In a third aspect of the present disclosure, a non-transitory computer-readable medium of a device storing one or more computer-executable instructions for decoding video data is provided. When the one or more computer-executable instructions are executed by one or more processors of the device, the one or more computer-executable instructions cause the device to: decode a merge subblock flag that specifies whether subblock-based inter prediction parameters for a coding unit are inferred from neighboring blocks and that determines whether a motion vector difference merge flag and a combination flag are to be decoded; determine a value of the merge subblock flag; decode the motion vector difference merge flag after the value of the merge subblock flag is determined as being equal to zero and a value of a motion vector difference flag is determined as being equal to one; and decode the combination flag that specifies whether a combined inter-picture merge and intra-picture prediction is applied to the coding unit by using the merge subblock flag and a sequence parameter set (SPS) flag for the combined inter-picture merge and intra-picture prediction, wherein: the motion vector difference merge flag specifies that a prediction parameter with a motion vector difference is used, and the motion vector difference flag specifies whether a merge mode with motion vector difference (MMVD) mode is enabled.

In a fourth aspect of the present disclosure, a device is provided. The device includes: one or more processors; and one or more non-transitory computer-readable media coupled to the one or more processors and storing one or more computer-executable instructions that, when executed by at least one of the one or more processors, cause the device to: code a merge subblock flag that specifies whether subblock-based inter prediction parameters for a coding unit are inferred from neighboring blocks and that determines whether a motion vector difference merge flag and a combination flag are to be coded; coding the motion vector difference merge flag after a value of the merge subblock flag is determined as being equal to zero and a value of a motion vector difference flag is determined as being equal to one; and code the combination flag that specifies whether a combined inter-picture merge and intra-picture prediction is applied to the coding unit by using the merge subblock flag and a sequence parameter set (SPS) flag for the combined inter-picture merge and intra-picture prediction, wherein: the motion vector difference merge flag specifies that a prediction parameter with a motion vector difference is used, and the motion vector difference flag specifies whether a merge mode with motion vector difference (MMVD) mode is enabled.

DESCRIPTION OF EMBODIMENTS

Figure 1:
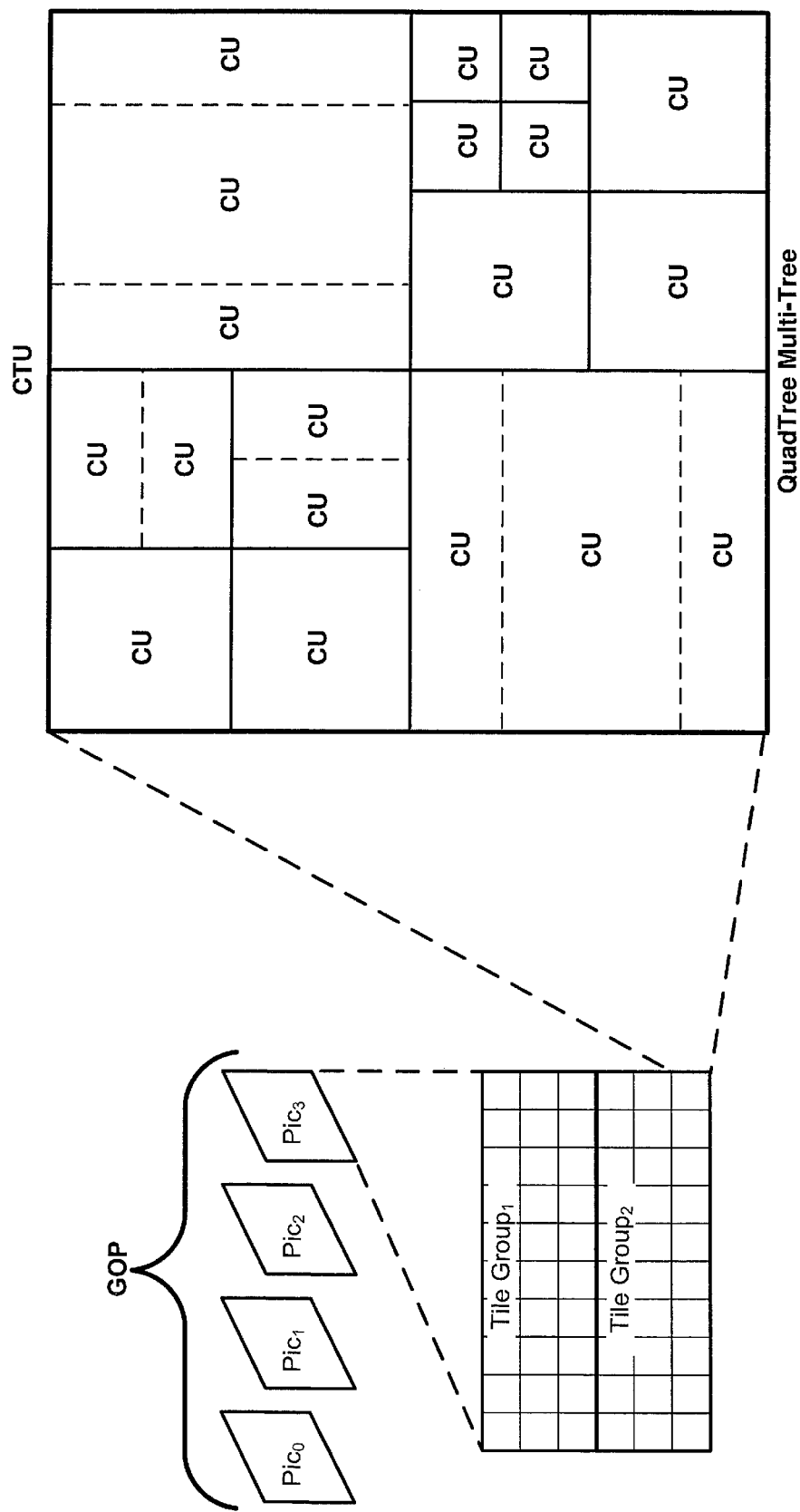
FIG. 1 is a conceptual diagram illustrating an example of a group of pictures coded according to a quad-tree multi-tree partitioning, in accordance with one or more techniques of this disclosure.

In general, this disclosure describes various techniques for coding (e.g., encoding and/or decoding) video data. In particular, this disclosure describes techniques for inter prediction in video coding. In particular, this disclosure describes techniques for indicating whether various inter prediction tools are enabled or disabled for coding video. Indicating whether various inter prediction tools are enabled or disabled according to the techniques described herein may be particularly useful for efficiently signaling the prediction technique used for coding a current video block. It should be noted that although techniques of this disclosure are described with respect to ITU-T H.264, ITU-T H.265, JVET-J1001, JVET-K1001, and JVET-L1001 the techniques of this disclosure are generally applicable to video coding. For example, the coding techniques described herein may be incorporated into video coding systems, (including video coding systems based on future video coding standards) including block structures, intra prediction techniques, inter prediction techniques, transform techniques, filtering techniques, and/or entropy coding techniques other than those included in ITU-T H.265. Thus, reference to ITU-T H.264, ITU-T H.265, JVET-J1001, JVET-K1001, and JVET-L1001 is for descriptive purposes and should not be construed to limit the scope of the techniques described herein. Further, it should be noted that incorporation by reference of documents herein should not be construed to limit or create ambiguity with respect to terms used herein. For example, in the case where an incorporated reference provides a different definition of a term than another incorporated reference and/or as the term is used herein, the term should be interpreted in a manner that broadly includes each respective definition and/or in a manner that includes each of the particular definitions in the alternative.

In one example, a method of performing inter prediction for coding video data, includes determining whether sub-block based inter prediction parameters for a current video block are inferred from neighboring blocks, signaling a flag specifying whether sub-block based inter prediction parameters for a current video block are inferred from neighboring blocks, and conditionally signaling a flag specifying whether a merge mode with motion vector difference values is used to generate inter prediction parameters of the current video block based on the value of the flag specifying whether sub-block based inter prediction parameters for a current video block are inferred from neighboring blocks.

In one example, a device includes one or more processors configured to determine whether sub-block based inter prediction parameters for a current video block are inferred from neighboring blocks, signal a flag specifying whether sub-block based inter prediction parameters for a current video block are inferred from neighboring blocks, and conditionally signal a flag specifying whether a merge mode with motion vector difference values is used to generate inter prediction parameters of the current video block based on the value of the flag specifying whether sub-block based inter prediction parameters for a current video block are inferred from neighboring blocks.

In one example, a non-transitory computer-readable storage medium includes instructions stored thereon that, when executed, cause one or more processors of a device to determine whether sub-block based inter prediction parameters for a current video block are inferred from neighboring blocks, signal a flag specifying whether sub-block based inter prediction parameters for a current video block are inferred from neighboring blocks, and conditionally signal a flag specifying whether a merge mode with motion vector difference values is used to generate inter prediction parameters of the current video block based on the value of the flag specifying whether sub-block based inter prediction parameters for a current video block are inferred from neighboring blocks.

In one example, an apparatus includes means for determining whether sub-block based inter prediction parameters for a current video block are inferred from neighboring blocks, means for signaling a flag specifying whether sub-block based inter prediction parameters for a current video block are inferred from neighboring blocks, and means for conditionally signaling a flag specifying whether a merge mode with motion vector difference values is used to generate inter prediction parameters of the current video block based on the value of the flag specifying whether sub-block based inter prediction parameters for a current video block are inferred from neighboring blocks.

In one example, a method of performing inter prediction for coding video data, includes parsing a flag specifying whether sub-block based inter prediction parameters for a current video block are inferred from neighboring blocks, and conditionally parsing a flag specifying whether a merge mode with motion vector difference values is used to generate inter prediction parameters of the current video block based on the value of the parsed flag specifying whether sub-block based inter prediction parameters for a current video block are inferred from neighboring blocks.

In one example, a device for includes one or more processors configured to parse a flag specifying whether sub-block based inter prediction parameters for a current video block are inferred from neighboring blocks, and conditionally parse a flag specifying whether a merge mode with motion vector difference values is used to generate inter prediction parameters of the current video block based on the value of the parsed flag specifying whether sub-block based inter prediction parameters for a current video block are inferred from neighboring blocks.

In one example, a non-transitory computer-readable storage medium includes instructions stored thereon that, when executed, cause one or more processors of a device to parse a flag specifying whether sub-block based inter prediction parameters for a current video block are inferred from neighboring blocks, and conditionally parse a flag specifying whether a merge mode with motion vector difference values is used to generate inter prediction parameters of the current video block based on the value of the parsed flag specifying whether sub-block based inter prediction parameters for a current video block are inferred from neighboring blocks.

In one example, an apparatus includes means for parsing a flag specifying whether sub-block based inter prediction parameters for a current video block are inferred from neighboring blocks, and means for conditionally parsing a flag specifying whether a merge mode with motion vector difference values is used to generate inter prediction parameters of the current video block based on the value of the parsed flag specifying whether sub-block based inter prediction parameters for a current video block are inferred from neighboring blocks.

The details of one or more examples are set forth in the accompanying drawings and the description below. Other features, objects, and advantages will be apparent from the description and drawings, and from the claims.

Video content typically includes video sequences including a series of frames (or pictures). A series of frames may also be referred to as a group of pictures (GOP). Each video frame or picture may be divided into one or more regions. Regions may be defined according to a base unit (e.g., a video block) and sets of rules defining a region (e.g., a region must be an integer number of video blocks arranged in a rectangle). As used herein, the term video block may generally refer to an area of a picture or may more specifically refer to the largest array of sample values that may be predictively coded, sub-divisions thereof, and/or corresponding structures. Further, the term current video block may refer to an area of a picture being encoded or decoded. A video block may be defined as an array of sample values that may be predictively coded. It should be noted that in some cases pixel values may be described as including sample values for respective components of video data, which may also be referred to as color components, (e.g., luma (Y) and chroma (Cb and Cr) components or red, green, and blue components). It should be noted that in some cases, the terms pixel value and sample value are used interchangeably. Further, in some cases a pixel or sample may be referred to as a pel. A video sampling format, which may also be referred to as a chroma format, may define the number of chroma samples included in a video block with respect to the number of luma samples included in a video block. For example, for the 4:2:0 sampling format, the sampling rate for the luma component is twice that of the chroma components for both the horizontal and vertical directions. As a result, for a video block formatted according to the 4:2:0 format, the width and height of an array of samples for the luma component are twice that of each array of samples for the chroma components. For a video block formatted according to the 4:2:2 format, the width of an array of samples for the luma component is twice that of the width of an array of samples for each chroma component, but the height of the array of samples for the luma component is equal to the height of an array of samples for each chroma component. Further, for a video block formatted according to the 4:4:4 format, an array of samples for the luma component has the same width and height as an array of samples for each chroma component.

Video blocks may be ordered within a picture and/or a region according to a scan pattern (e.g., a raster scan). A video encoder may perform predictive encoding on video blocks and sub-divisions thereof. Video blocks and sub-divisions thereof may be referred to as nodes. ITU-T H.264 specifies a macroblock including 16×16 luma samples. That is, in ITU-T H.264, a picture is segmented into macroblocks. ITU-T H.265 specifies an analogous Coding Tree Unit (CTU) structure (may also be referred to as a largest coding unit (LCU)). In ITU-T H.265, pictures are segmented into CTUs. In ITU-T H.265, for a picture, a CTU size may be set as including 16×16, 32×32, or 64×64 luma samples. In ITU-T H.265, a CTU is composed of respective Coding Tree Blocks (CTB) for each component of video data (e.g., luma (Y) and chroma (Cb and Cr). Further, in ITU-T H.265, a CTU may be partitioned according to a quadtree (QT) partitioning structure, which results in the CTBs of the CTU being partitioned into Coding Blocks (CB). That is, in ITU-T H.265, a CTU may be partitioned into quadtree leaf nodes. According to ITU-T H.265, one luma CB together with two corresponding chroma CBs and associated syntax elements are referred to as a coding unit (CU). In ITU-T H.265, a minimum allowed size of a CB may be signaled. In ITU-T H.265, the smallest minimum allowed size of a luma CB is 8×8 luma samples. In ITU-T H.265, the decision to code a picture area using intra prediction or inter prediction is made at the CU level.

In ITU-T H.265, a CU is associated with a prediction unit (PU) structure having its root at the CU. In ITU-T H.265, PU structures allow luma and chroma CBs to be split for purposes of generating corresponding reference samples. That is, in ITU-T H.265, luma and chroma CBs may be split into respect luma and chroma prediction blocks (PBs), where a PB includes a block of sample values for which the same prediction is applied. In ITU-T H.265, a CB may be partitioned into 1, 2, or 4 PBs. ITU-T H.265 supports PB sizes from 64×64 samples down to 4×4 samples. In ITU-T H.265, square PBs are supported for intra prediction, where a CB may form the PB or the CB may be split into four square PBs (e.g., intra prediction PB types include M×M or M/2×M/2, where M is the height and width of the square CB). In ITU-T H.265, in addition to the square PBs, rectangular PBs are supported for inter prediction, where a CB may by halved vertically or horizontally to form PBs (e.g., inter prediction PB types include M×M, M/2×M/2, M/2×M, or M×M/2). Further, it should be noted that in ITU-T H.265, for inter prediction, four asymmetric PB partitions are supported, where the CB is partitioned into two PBs at one-quarter of the height (at the top or the bottom) or width (at the left or the right) of the CB (e.g., asymmetric partitions include M/4×M left, M/4×M right, M×M/4 top, and M×M/4 bottom). Intra prediction data (e.g., intra prediction mode syntax elements) or inter prediction data (e.g., motion data syntax elements) corresponding to a PB is used to produce reference and/or predicted sample values for the PB.

As described above, each video frame or picture may be divided into one or more regions. For example, according to ITU-T H.265, each video frame or picture may be partitioned to include one or more slices and further partitioned to include one or more tiles, where each slice includes a sequence of CTUs (e.g., in raster scan order) and where a tile is a sequence of CTUs corresponding to a rectangular area of a picture. It should be noted that a slice, in ITU-T H.265, is a sequence of one or more slice segments starting with an independent slice segment and containing all subsequent dependent slice segments (if any) that precede the next independent slice segment (if any) within the same access unit. A slice segment, like a slice, is a sequence of CTUs. Thus, in some cases, the terms slice and slice segment may be used interchangeably to indicate a sequence of CTUs. Further, it should be noted that in ITU-T H.265, a tile may consist of CTUs contained in more than one slice and a slice may consist of CTUs contained in more than one tile. However, ITU-T H.265 provides that one or both of the following conditions shall be fulfilled: (1) All CTUs in a slice belong to the same tile; and (2) All CTUs in a tile belong to the same slice. With respect to JVET-L1001, slices are required to consist of an integer number of complete tiles instead of only being required to consist of an integer number of complete CTUs. As such, a slice including a set of CTUs which do not form a rectangular region of a picture may or may not be supported in some video coding techniques. Further, a slice that is required to consist of an integer number of complete tiles is referred to as a tile group. The techniques described herein may be applicable to slices, tiles, and/or tile groups. FIG. 1 is a conceptual diagram illustrating an example of a group of pictures including tile groups. Specifically, FIG. 1 is a conceptual diagram illustrating an example of a group of pictures coded according to a quad-tree multi-tree partitioning, in accordance with one or more techniques of this disclosure. In the example illustrated in FIG. 1, $Pic_3$ is illustrated as including two tile groups (e.g., Tile Group$_1$ and Tile Group$_2$). It should be noted that in some cases, Tile Group$_1$ and Tile Group$_2$ may be classified as slices and/or tiles, as each may fulfill the requirements of a slice and a tile.

JEM specifies a CTU having a maximum size of 256×256 luma samples. JEM specifies a quadtree plus binary tree (QTBT) block structure. In JEM, the QTBT structure enables quadtree leaf nodes to be further partitioned by a binary tree (BT) structure. That is, in JEM, the binary tree structure enables quadtree leaf nodes to be recursively divided vertically or horizontally. In JVET-L1001, CTUs are partitioned according a quadtree plus multi-type tree (QTMT) structure. The QTMT in JVET-L1001 is similar to the QTBT in JEM. However, in JVET-L1001, in addition to indicating binary splits, the multi-type tree may indicate so-called ternary (or triple tree (TT)) splits. A ternary split divides a block vertically or horizontally into three blocks. In the case of a vertical TT split, a block is divided at one-quarter of its width from the left edge and at one-quarter its width from the right edge and in the case of a horizontal TT split a block is at one-quarter of its height from the top edge and at one-quarter of its height from the bottom edge. Referring again to FIG. 1, FIG. 1 illustrates an example of a CTU being partitioned into quadtree leaf nodes and quadtree leaf nodes being further partitioned according to a BT split or a TT split. That is, in FIG. 1 dashed lines indicate additional binary and ternary splits in a quadtree.

As described above, intra prediction data or inter prediction data is used to produce reference sample values for a current video block. The difference between sample values included in a prediction generated from the reference sample values and the current video block may be referred to as residual data. Residual data may include respective arrays of difference values corresponding to each component of video data. Residual data may be in the pixel domain. A transform, such as, a discrete cosine transform (DCT), a discrete sine transform (DST), an integer transform, a wavelet transform, or a conceptually similar transform, may be applied to an array of difference values to generate transform coefficients. It should be noted that in ITU-T H.265 and WET-L1001, a CU is associated with a transform unit (TU) structure having its root at the CU level. That is, an array of difference values may be partitioned for purposes of generating transform coefficients (e.g., four 8×8 transforms may be applied to a 16×16 array of residual values). For each component of video data, such sub-divisions of difference values may be referred to as Transform Blocks (TBs). It should be noted that in some cases, a core transform and a subsequent secondary transforms may be applied (in the video encoder) to generate transform coefficients. For a video decoder, the order of transforms is reversed.

A quantization process may be performed on transform coefficients. Quantization essentially scales transform coefficients in order to vary the amount of data required to represent a group of transform coefficients. Quantization may include division of transform coefficients by a quantization scaling factor and any associated rounding functions (e.g., rounding to the nearest integer). Quantized transform coefficients may be referred to as coefficient level values. Inverse quantization (or "dequantization") may include multiplication of coefficient level values by the quantization scaling factor. It should be noted that as used herein the term quantization process in some instances may refer to division by a scaling factor to generate level values and multiplication by a scaling factor to recover transform coefficients in some instances. That is, a quantization process may refer to quantization in some cases and inverse quantization in some cases.

Figure 2A:
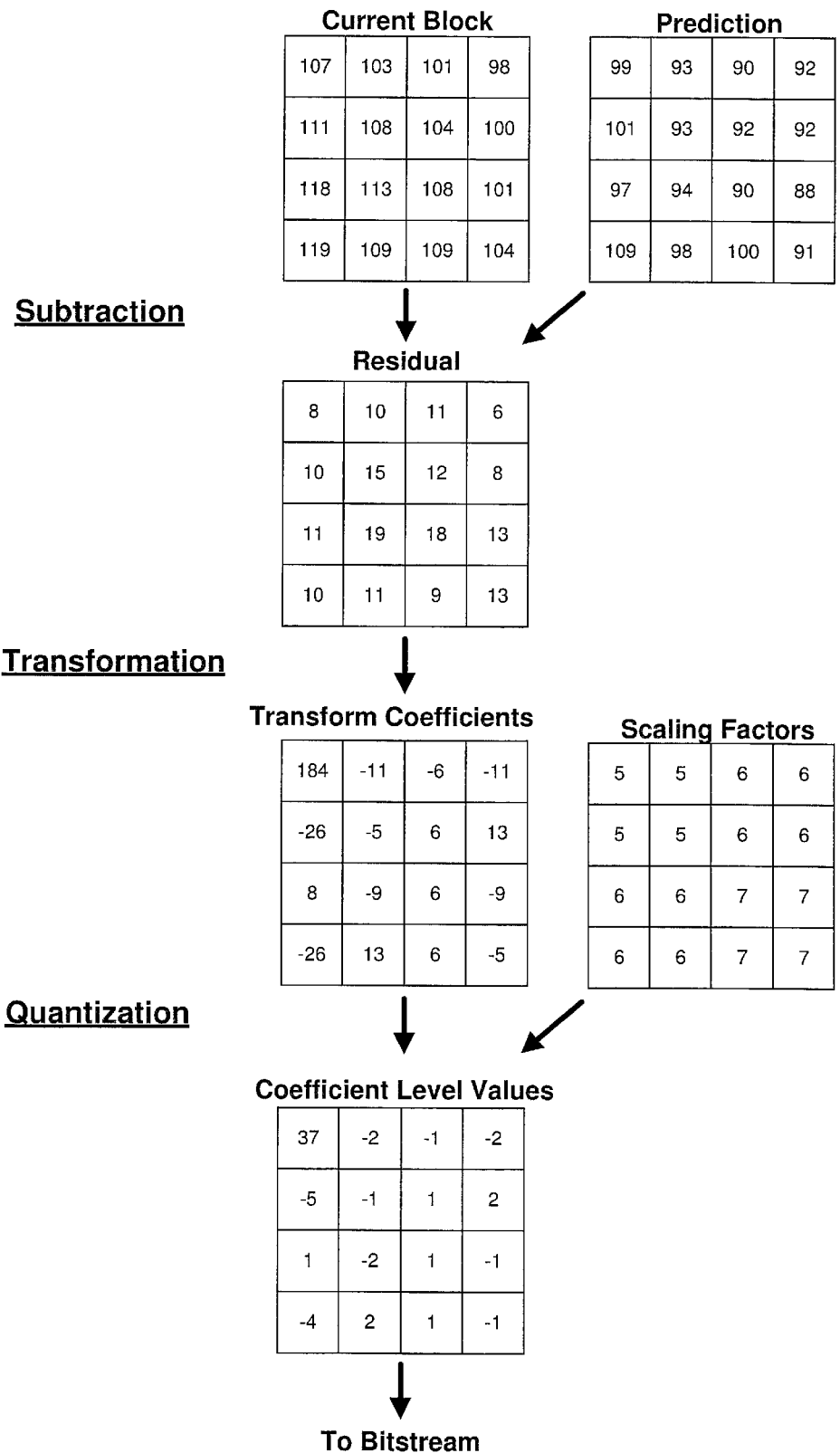
FIG. 2A is a conceptual diagram illustrating an example of coding a block of video data, in accordance with one or more techniques of this disclosure.
Figure 2B:
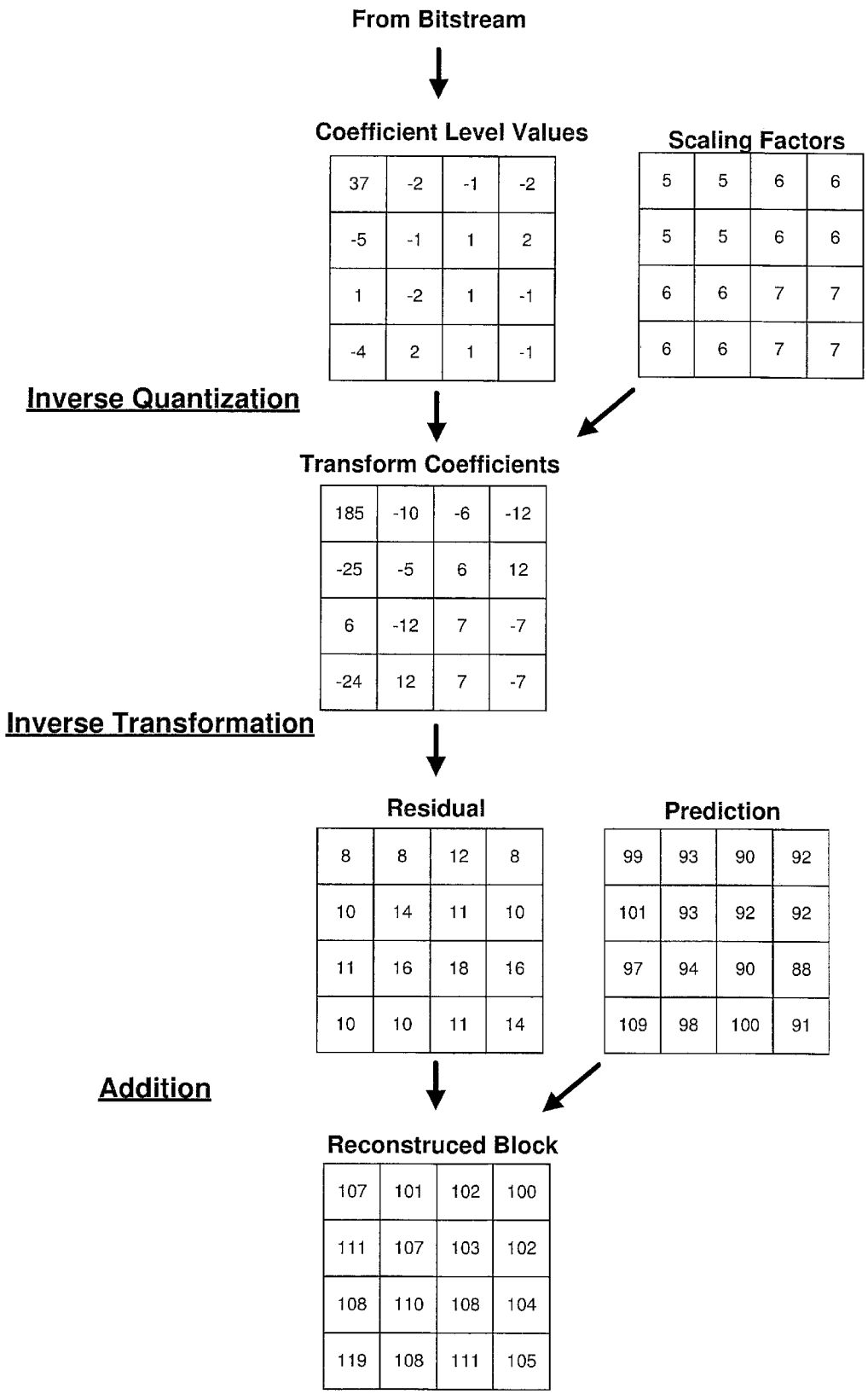
FIG. 2B is a conceptual diagram illustrating an example of coding a block of video data, in accordance with one or more techniques of this disclosure.

FIGS. 2-2B are conceptual diagrams illustrating examples of coding a block of video data, in accordance with one or more techniques of this disclosure. As illustrated in FIG. 2A, a current block of video data is encoded by generating a residual by subtracting a set of prediction values from the current block of video data, performing a transformation on the residual, and quantizing the transform coefficients to generate level values. As illustrated in FIG. 2B, the current block of video data is decoded by performing inverse quantization on level values, performing an inverse transform, and adding a set of prediction values to the resulting residual. It should be noted that in the examples in FIGS. 2A-2B, the sample values of the reconstructed block differ from the sample values of the current video block that is encoded. In this manner, coding may be said to be lossy. However, the difference in sample values may be considered acceptable and/or imperceptible to a viewer of the reconstructed video. Further, as illustrated in FIGS. 2A-2B, scaling is performed using an array of scaling factors.

As illustrated in FIG. 2A, quantized transform coefficients are coded into a bitstream. Quantized transform coefficients and syntax elements (e.g., syntax elements indicating a coding structure for a video block) may be entropy coded according to an entropy coding technique. Examples of entropy coding techniques include content-adaptive variable length coding (CAVLC), context-adaptive binary arithmetic coding (CABAC), probability interval partitioning entropy coding (PIPE), and the like. Entropy encoded quantized transform coefficients and corresponding entropy encoded syntax elements may form a compliant bitstream that can be used to reproduce video data at a video decoder. An entropy coding process may include performing a binarization on syntax elements. Binarization refers to the process of converting a value of a syntax value into a series of one or more bits. These bits may be referred to as "bins." Binarization is a lossless process and may include one or a combination of the following coding techniques: fixed length coding, unary coding, truncated unary coding, truncated Rice coding, Golomb coding, k-th order exponential Golomb coding, and Golomb-Rice coding. For example, binarization may include representing the integer value of 5 for a syntax element as 00000101 using an 8-bit fixed length binarization technique or representing the integer value of 5 as 11110 using a unary coding binarization technique. As used herein each of the terms fixed length coding, unary coding, truncated unary coding, truncated Rice coding, Golomb coding, k-th order exponential Golomb coding, and Golomb-Rice coding may refer to general implementations of these techniques and/or more specific implementations of these coding techniques. For example, a Golomb-Rice coding implementation may be specifically defined according to a video coding standard, for example, ITU-T H.265.

An entropy coding process further includes coding bin values using lossless data compression algorithms. In the example of CABAC, for a particular bin, a context model may be selected from a set of available context models associated with the bin. In some examples, a context model may be selected based on a previous bin and/or values of previous syntax elements. A context model may identify the probability of a bin having a particular value. For instance, a context model may indicate a 0.7 probability of coding a 0-valued bin. After selecting an available context model, a CABAC entropy encoder may arithmetically code a bin based on the identified context model. The context model may be updated based on the value of a coded bin. The context model may be updated based on an associated variable stored with the context, e.g., adaptation window size, number of bins coded using the context. It should be noted, that a CABAC entropy encoder may be implemented, such that some syntax elements may be entropy encoded using arithmetic encoding without the usage of an explicitly assigned context model, such coding may be referred to as bypass coding.

As described above, intra prediction data or inter prediction data indicate how a prediction is generating for a current video block. For intra prediction coding, an intra prediction mode may specify the location of reference samples within a picture used for generating a prediction. In ITU-T H.265, defined possible intra prediction modes include a planar (e.g., surface fitting) prediction mode (predMode: 0), a DC (e.g., flat overall averaging) prediction mode (predMode: 1), and 33 angular prediction modes (predMode: 2-34). In JVET-L1001, defined possible intra-prediction modes for luma include a planar prediction mode (predMode: 0), a DC prediction mode (predMode: 1), and 65 angular prediction modes (predMode: 2-66). It should be noted that planar and DC prediction modes may be referred to as non-directional prediction modes and that angular prediction modes may be referred to as directional prediction modes. Further, there may be various ways in which intra prediction modes for the chroma components may be derived based on the intra prediction mode for the luma component. It should be noted that the techniques described herein may be generally applicable regardless of the number of defined possible prediction modes.

For inter prediction coding, a reference picture is determined from one or more previously decoded pictures and a motion vector (MV) identifies samples in the reference picture that are used to generate a prediction for a current video block. For example, a current video block may be predicted using reference sample values located in one or more previously coded picture(s) and a motion vector is used to indicate the location of the reference block relative to the current video block. A motion vector may describe, for example, a horizontal displacement component of the motion vector (e.g., $MV_x$), a vertical displacement component of the motion vector (e.g., $MV_y$), and a resolution for the motion vector (e.g., one-quarter pixel precision, one-half pixel precision, one-pixel precision, two-pixel precision, four-pixel precision). Previously decoded pictures, which may include pictures output before or after a current picture, may be organized into one or more to reference pictures lists and identified using a reference picture index value. Further, in inter prediction coding, uni-prediction refers to generating a prediction using sample values from a single reference picture and bi-prediction refers to generating a prediction using respective sample values from two reference pictures. That is, in uni-prediction, a single reference picture and corresponding motion vector are used to generate a prediction for a current video block and in bi-prediction, a first reference picture and corresponding first motion vector and a second reference picture and corresponding second motion vector are used to generate a prediction for a current video block. In bi-prediction, respective sample values are combined (e.g., added, rounded, and clipped, or averaged according to weights) to generate a prediction. Pictures and regions thereof may be classified based on which types of prediction modes may be utilized for encoding video blocks thereof. That is, for regions having a B type (e.g., a B slice), bi-prediction, uni-prediction, and intra prediction modes may be utilized, for regions having a P type (e.g., a P slice), uni-prediction, and intra prediction modes may be utilized, and for regions having an I type (e.g., an I slice), only intra prediction modes may be utilized. As described above, reference pictures are identified through reference indices. In ITU-T H.265, for a P slice, there is a single reference picture list, RefPicList0 and for a B slice, there is a second independent reference picture list, RefPicList1, in addition to RefPicList0. It should be noted that for uni-prediction in a B slice, one of RefPicList0 or RefPicList1 may be used to generate a prediction. Further, it should be noted that in ITU-T H.265, during the decoding process, at the onset of decoding a picture, reference picture list(s) are generated from previously decoded picture stored in a decoded picture buffer (DPB).

Further, a coding standard may support various modes of motion vector prediction. Motion vector prediction enables the value of a motion vector to be derived based on another motion vector. Examples of motion vector prediction include advanced motion vector prediction (AMVP), temporal motion vector prediction (TMVP), so-called "merge" mode, and "skip" and "direct" motion inference. Further, other examples of motion vector prediction include advanced temporal motion vector prediction (ATMVP) and Spatial-temporal motion vector prediction (STMVP). ITU-T H.265 supports two modes for motion vector prediction: a merge mode and so-called Advanced Motion Vector Prediction (AMVP). In ITU-T H.265, for both the merge mode and the AMVP for a current PB, a set of candidate blocks is derived. Both a video encoder and video decoder perform the same process to derive a set of candidates. Thus, for a current video block, the same set of candidates is generated during encoding and decoding. A candidate block includes a video block having associated motion information from which motion information used to generate a prediction for a current video block can be derived. For the merge mode in ITU-T H.265, all motion information (e.g., motion vector displacement values, reference picture indices, and reference picture lists) associated with a selected candidate is inherited as the motion information for the current PB. That is, at a video encoder, a candidate block is selected from the derived set of candidates and an index value included in the bitstream indicates the selected candidate and thus, indicates the motion information for the current PB. For AMVP in ITU-T H.265, the motion vector information for the selected candidate is used as a motion vector predictor (MVP) for the motion vector of the current PB. That is, at a video encoder, a candidate block is selected from the derived set of candidates and an index value indicating the selected candidate and a delta value (e.g., a motion vector delta (MVD)) indicating the difference between the motion vector predictor and the motion vector for the current PB are included in the bitstream. Further, for AMVP in ITU-T H.265, syntax elements identifying a reference picture are included in the bitstream.

In ITU-T H.265, a set of candidate blocks may be derived from spatial neighboring blocks, and temporal blocks. Further, generated (or default) motion information may be used for motion vector prediction. In ITU-T H.265, whether motion information used for motion vector prediction of a current PB includes motion information associated with spatial neighboring blocks, motion information associated with temporal blocks, or generated motion information is dependent on the number of candidates to be included in a set, whether temporal motion vector prediction is enabled, the availability of blocks, and/or whether motion information associated with blocks is redundant.

Figure 3:
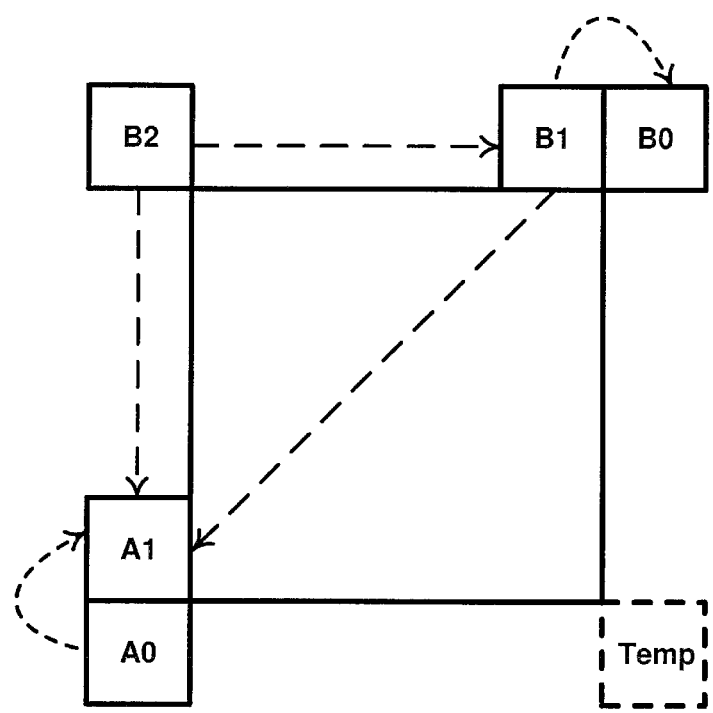
FIG. 3 is a conceptual diagram illustrating the position of neighboring video blocks for inclusion in a set of candidate motion vector predictors, in accordance with one or more techniques of this disclosure.

For the merge mode in ITU-T H.265, a maximum number of candidates that may be included in a set of candidate blocks may be set and signaled by a video encoder and may be up to five. Further, a video encoder may disable the use of temporal motion vector candidates (e.g., in order to reduce the amount memory resources needed to store motion information at a video decoder) and signal whether the use of temporal motion vector candidates is enabled or disabled for a picture. FIG. 3 is a conceptual diagram illustrating the position of neighboring video blocks for inclusion in a set of candidate motion vector predictors, in accordance with one or more techniques of this disclosure. FIG. 3 illustrates the position of spatial neighboring blocks and the temporal block that may be included in a set of candidate blocks for the merge mode in ITU-T H.265. The derivation of the set of candidates for merge mode in ITU-T H.265 includes determining the availability of A1, B1, B0, A0, and B2. It should be noted that a block is considered unavailable, if it is intra-predicted (e.g., does not have corresponding motion information) or is not included in the current slice (or tile). After determining the availability of A1, B1, B0, A0, and B2, a set of comparisons (illustrated as dashed arrows in FIG. 3) is performed to remove redundant entries from the set of candidates. For example, B2 is compared to B1 and if B1 has associated motion information that is equal to that of B2, it is removed from the set of candidates. The removal of entries from a set of candidates may be referred to as a pruning process. It should be noted that in FIG. 3, in order to reduce complexity, a complete comparison of candidates is not performed (e.g., A0 is not compared to B0) and as such, it is possible that redundant entries are included in the set of candidates.

Referring again to FIG. 3, the dashed block labeled Temp refers to the temporal candidate that may be included in the set of candidates. In ITU-T H.265 for merge mode, for the temporal candidate, a spatially collocated PU included in a reference picture is defined and the temporal candidate includes a block having a position just outside to the bottom right of the collocated PU, if available, or the block at the center position of the collocated PU. As described above, a maximum number of candidates that may be included in a set of candidate blocks is set. If the maximum number of candidates is set to N, N-1 spatial candidates and the temporal candidate are included in the set, in cases where the number of available spatial candidates (after pruning) and temporal candidate is greater than or equal to N. In cases where the number of available spatial candidates (after pruning) and temporal candidate is less than N, generated motion information is included in the set in order to fill the set.

Figure 4:
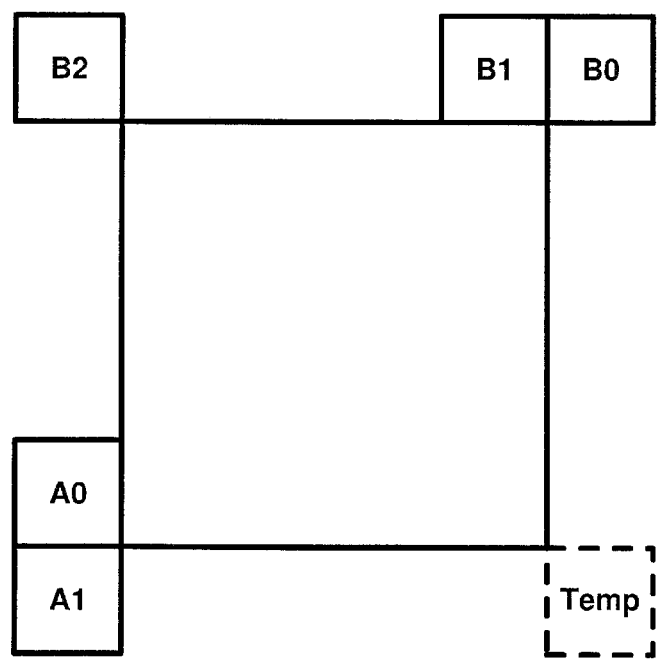
FIG. 4 is a conceptual diagram illustrating the position neighboring video blocks for inclusion in a set of candidate motion vector predictors, in accordance with one or more techniques of this disclosure.

FIG. 4 is a conceptual diagram illustrating the position neighboring video blocks for inclusion in a set of candidate motion vector predictors, in accordance with one or more techniques of this disclosure. For AMVP in ITU-T H.265, referring to FIG. 4, the derivation of the set of candidates includes adding one of A0 or A1 (e.g., a left candidate) and one of B0, B1 or B2 (an above candidate) to the set based on their availability. That is, the first available left candidate and the first available above candidate are added to the set. When the left candidate and the above candidate have redundant motion vector components, one redundant candidate is removed from the set. If the number of candidates included in the set is less than two, and temporal motion vector prediction is enabled, the temporal candidate (Temp) is included in the set. In cases where the number of available spatial candidates (after pruning) and temporal candidate included in the set is less than two, a zero value motion vector is included in the set in order to fill the set With respect to the equations used herein, the following arithmetic operators may be used:
+ Addition
− Subtraction
* Multiplication, including matrix multiplication
$x^y$ Exponentiation. Specifies x to the power of y. In other contexts, such notation is used for superscripting not intended for interpretation as exponentiation.
/ Integer division with truncation of the result toward zero. For example, 7/4 and −7/−4 are truncated to 1 and −7/4 and 7/−4 are truncated to −1.
÷ Used to denote division in mathematical equations where no truncation or rounding is intended.

$$\frac{x}{y}$$

Used to denote division in mathematical equations where no truncation or rounding is intended.
x % y Modulus. Remainder of x divided by y, defined only for integers x and y with x>=0 and y>.
Further, the following mathematical functions may be used:
Log2(x) the base-2 logarithm of x;

$$\text{Min}(x, y) = \begin{cases} x; & x <= y \\ y; & x > y \end{cases};$$

$$\text{Max}(x, y) = \begin{cases} x; & x >= y \\ y; & x < y \end{cases}$$

Ceil(x) the smallest integer greater than or equal to x.

$$\text{Clip3}(x, y, z) = \begin{cases} x; & z < x \\ y; & z > y \\ z; & \text{otherwise} \end{cases}$$

$$\text{Sign}(x) = \begin{cases} 1; & x > 0 \\ 0; & x = 0 \\ -1; & x < 0 \end{cases}$$

$$\text{Abs}(x) = \begin{cases} x; & x >= 0 \\ -x; & x < 0 \end{cases}$$

Further, the following logical operators may be used:
x&&y Boolean logical "and" of x and y
x||y Boolean logical "or" of x and y
! Boolean logical "not"
x?y:z If x is TRUE or not equal to 0, evaluates to the value of y; otherwise, evaluates to the value of z.
Further, the following relational operators may be used:
> Greater than
>= Greater than or equal to
< Less than
<= Less than or equal to
== Equal to
!= Not equal to Further, the following bit-wise operators may be used:
& Bit-wise "and". When operating on integer arguments, operates on a two's complement representation of the integer value. When operating on a binary argument that contains fewer bits than another argument, the shorter argument is extended by adding more significant bits equal to 0.
| Bit-wise "or". When operating on integer arguments, operates on a two's complement representation of the integer value. When operating on a binary argument that contains fewer bits than another argument, the shorter argument is extended by adding more significant bits equal to 0.
^ Bit-wise "exclusive or". When operating on integer arguments, operates on a two's complement representation of the integer value. When operating on a binary argument that contains fewer bits than another argument, the shorter argument is extended by adding more significant bits equal to 0.
x>>y Arithmetic right shift of a two's complement integer representation of x by y binary digits. This function is defined only for non-negative integer values of y. Bits shifted into the most significant bits (MSBs) as a result of the right shift have a value equal to the MSB of x prior to the shift operation.
x<<y Arithmetic left shift of a two's complement integer representation of x by y binary digits. This function is defined only for non-negative integer values of y. Bits shifted into the least significant bits (LSBs) as a result of the left shift have a value equal to 0.

JVET-L1001 includes a merge mode based on the merge mode defined in ITU-T H.265 and an AMVP mode based on the AMVP defined in ITU-T H.256. As described above, in ITU-H.265, motion vector prediction is performed for a current PB, which may result from further partitioning a CU. Further, as described above, in JVET-L1001, the QTMT is used to partition a CTU into CUs. In some cases, in JVET-L1001, a prediction may be generated for a current CU by deriving motion information on a CU-by-CU basis (e.g., for each CB a single motion vector or single motion vector pair is derived and used to generate a prediction). In other cases, a prediction may be generated for a current CU by deriving motion information for sub-blocks within a CU. For example, a 32×32 CU may be divided into 64 4×4 sub-blocks and motion information may be derived for each sub-block and the respective motion information for each sub-block may be used to generate a prediction for the CU. Using sub-blocks to generate a prediction for a CU may be referred to as sub-block inter prediction. An example of sub-block inter prediction includes the so-called affine mode described in JVET-L1001. Motion vector prediction techniques may be utilized for sub-block inter prediction techniques. Such techniques, in some cases, may be referred to as sub-block-based motion vector prediction. Thus, in JVET-L1001 there are various ways in which inter prediction may be performed in order to generate a prediction for a current CU. The various ways in which inter prediction may be performed in order to generate a prediction for a current CU may be referred to as inter prediction tools.

Table 1 illustrates the CU level syntax provided in JVET-L1001 that is used to indicate how a particular inter prediction tool is used to generate a prediction for the current CU.

TABLE 1

| | Descriptor |
|---|---|
| coding_unit( x0, y0, cbWidth, cbHeight, treeType ) { | |
|   if( slice_type != I ) { | |
|     cu_skip_flag[ x0 ][ y0 ] | ae(v) |
|     if( cu_skip_flag[ x0 ][ y0 ] == 0 ) | |
|       pred_mode_flag | ae(v) |
|   } | |
| ... | |
|   } else { /* MODE_INTER */ | |
|     if( cu_skip_flag[ x0 ][ y0 ] ) { | |
|       mmvd_flag[ x0 ][ y0 ] | ae(v) |
|       if( mmvd_flag[ x0 ][ y0 ] == 1 ) { | |
|         mmvd_merge_flag[ x0 ][ y0 ] | ae(v) |
|         mmvd_distance_idx[ x0 ][ y0 ] | ae(v) |
|         mmvd_direction_idx[ x0 ][ y0 ] | ae(v) |
|       } else { | |
|         if( MaxNumSubblockMergeCand > 0 && cbWidth >= 8 && cbHeight >= 8 ) | |
|           merge_subblock_flag[ x0 ][ y0 ] | ae(v) |
|         if( merge_subblock_flag[ x0 ][ y0 ] == 0 && MaxNumMergeCand > 1 ) | |
|           merge_idx[ x0 ][ y0 ] | ae(v) |
|         if( merge_subblock_flag[ x0 ][ y0 ] == 1 && MaxNumSubblockMergeCand > 1 ) | |
|           merge_subblock_idx[ x0 ][ y0 ] | ae(v) |
|       } | |
|     } else { | |
|       merge_flag[ x0 ][ y0 ] | ae(v) |
|       if( merge_flag[ x0 ][ y0 ] ) { | |
|         mmvd_flag[ x0 ][ y0 ] | ae(v) |
|         if( mmvd_flag[ x0 ][ y0 ] == 1 ) { | |
|           mmvd_merge_flag[ x0 ][ y0 ] | ae(v) |
|           mmvd_distance_idx[ x0 ][ y0 ] | ae(v) |
|           mmvd_direction_idx[ x0 ][ y0 ] | ae(v) |
|         } else { | |
|           if( MaxNumSubblockMergeCand > 0 && cbWidth >= 8 && cbHeight >= 8 ) | |
|             merge_subblock_flag[ x0 ][ y0 ] | ae(v) |
|           if( merge_subblock_flag[ x0 ][ y0 ] == 0 && MaxNumMergeCand > 1 ) | |
|             merge_idx[ x0 ][ y0 ] | ae(v) |
|           if( merge_subblock_flag[ x0 ][ y0 ] == 1 && | |
|             MaxNumSubblockMergeCand > 1 ) | |
|             merge_subblock_idx[ x0 ][ y0 ] | ae(v) |
|         } | |
|         if( mmvd_flag[ x0 ][ y0 ] == 0 && merge_subblock_flag[ x0 ][ y0 ] == 0 && ( cbWidth * cbHeight ) >= 64 && cbWidth < 128 && cbHeight < 128) { | |
|           mh_intra_flag[ x0 ][ y0 ] | ae(v) |
|           if( mh_intra_ flag[ x0 ][ y0 ] ) { | |
|             mh_intra_luma_mpm_flag[ x0 ][ y0 ] | ae(v) |
|             if( mh_intra_luma_mpm_flag[ x0 ][ y0 ] ) | |
|               mh_intra_luma_mpm_idx[ x0 ][ y0 ] | ae(v) |
|           } | |
|         } | |
|       } else { | |
|         if( slice_type == B ) | |
|           inter_pred_idc[ x0 ][ y0 ] | ae(v) |
|         if( sps_affine_enabled_flag && cbWidth >=16 && cbHeight >= 16 ) { | |
|           inter_affine_flag[ x0 ][ y0 ] | ae(v) |
|           if( sps_affine_type_flag && inter_affine_flag[ x0 ][ y0 ] ) | |
|             cu_affine_type_flag[ x0 ][ y0 ] | ae(v) |
|         } | |
|         if( inter_pred_idc[ x0 ][ y0 ] != PRED_L1 ) { | |
|           if( num_ref_idx_l0_active_minus1 > 0 ) | |
|             ref_idx_l0[ x0 ][ y0 ] | ae(v) |
|           mvd_coding( x0, y0, 0, 0 ) | |
|           if( MotionModelIdc[ x0 ][ y0 ] > 0 ) | |
|             mvd_coding( x0, y0, 0, 1 ) | |
|           if(MotionModelIdc[ x0 ][ y0 ] > 1 ) | |
|             mvd_coding( x0, y0, 0, 2 ) | |
|           mvp_l0_flag[ x0 ][ y0 ] | ae(v) |
|         } else { | |
|           MvdL0[ x0 ][ y0 ][ 0 ] = 0 | |
|           MvdL0[ x0 ][ y0 ][ 1 ] = 0 | |
|         } | |
|         if( inter_pred_idc[ x0 ][ y0 ] != PRED_L0 ) { | |

TABLE 1-continued

| | Descriptor |
|---|---|
|       if( num_ref_idx_l1_active_minus1 > 0 )<br>        ref_idx_l1[ x0 ][ y0 ]<br>      if( mvd_l1_zero_flag && inter_pred_idc[ x0 ][ y0 ] = =<br>PRED_BI ) {<br>        MvdL1[ x0 ][ y0 ][ 0 ] = 0<br>        MvdL1[ x0 ][ y0 ][ 1 ] = 0<br>        MvdCpL1[ x0 ][ y0 ][ 0 ][ 0 ] = 0<br>        MvdCpL1[ x0 ][ y0 ][ 0 ][ 1 ] = 0<br>        MvdCpL1[ x0 ][ y0 ][ 1 ][ 0 ] = 0<br>        MvdCpL1[ x0 ][ y0 ][ 1 ][ 1 ] = 0<br>        MvdCpL1[ x0 ][ y0 ][ 2 ][ 0 ] = 0<br>        MvdCpL1[ x0 ][ y0 ][ 2 ][ 1 ] = 0<br>      } else {<br>        mvd_coding( x0, y0, 1, 0 )<br>      if( MotionModelIdc[ x0 ][ y0 ] > 0 )<br>        mvd_coding( x0, y0, 1, 1 )<br>      if(MotionModelIdc[ x0 ][ y0 ] > 1 )<br>        mvd_coding( x0, y0, 1, 2 )<br>      mvp_l1 _flag[ x0 ][ y0 ] | ae(v)<br><br>ae(v) |
|       } else {<br>        MvdL1[ x0 ][ y0 ][ 0 ] = 0<br>        MvdL1[ x0 ][ y0 ][ 1 ] = 0<br>      }<br>      if( sps_amvr_enabled_flag && inter_affine_flag = = 0 &&<br>        ( MvdL0[ x0 ][ y0 ][ 0 ] != 0 | | MvdL0[ x0 ][ y0 ][ 1 ] != 0 | |<br>        MvdL1[ x0 ][ y0 ][ 0 ] != 0 | | MvdL1[ x0 ][ y0 ][ 1 ] != 0 ) )<br>        amvr_mode[ x0 ][ y0 ] | ae(v) |
|       if( sps_gbi_enabled_flag && inter_pred_idc[ x0 ][ y0 ] = =<br>PRED_BI &&<br>        cbWidth * cbHeight >= 256 )<br>        gbi_idx[ x0 ][ y0 ]<br>      }<br>    }<br>  }<br>  if( !pcm_flag[ x0 ][ y0 ] ) {<br>    if( CuPredMode[ x0 ][ y0 ] != MODE_INTRA &&<br>cu_skip_flag[ x0 ][ y0 ] = = 0 )<br>      cu_cbf<br>    if( cu_cbf )<br>      transform_tree( x0, y0, cbWidth, cbHeight, treeType )<br>  }<br>} | ae(v)<br><br><br><br><br>ae(v) |

With respect to Table 1, JVET-L1001 provides the following definitions of the respective syntax elements:

cu_skip_flag[x0][y0] equal to 1 specifies that for the current coding unit, when decoding a P or B slice, no more syntax elements except the merge plus MVD flag mmvd_flag[x0][y0], the merge plus MVD index mmvd_merge_flag[x0][y0], the merge plus MVD distance index mmvd distance_idx[x0][y0], the merge plus MVD direction index mmvd_direction_idx[x0][y0], the merging candidate index merge_idx[x0][y0] the subblock-based merge flag merge_subblock_flag[x0][y0], and the subblock-based merging candidate index merge_subblock_idx[x0][y0] are parsed after cu_skip_flag[x0][y0]. cu_skip_flag[x0][y0] equal to 0 specifies that the coding unit is not skipped. The array indices x0, y0 specify the location (x0, y0) of the top-left luma sample of the considered coding block relative to the top-left luma sample of the picture.

When cu_skip_flag[x0][y0] is not present, it is inferred to be equal to 0.

pred_mode_flag equal to 0 specifies that the current coding unit is coded in inter prediction mode. pred_mode_flag equal to 1 specifies that the current coding unit is coded in intra prediction mode. The variable CuPredMode [x][y] is derived as follows for x=x0 . . . x0+cbWidth−1 and y=y0 . . . y0+cbHeight−1:

If pred_mode_flag is equal to 0, CuPredMode[x][y] is set equal to MODE_INTER.

Otherwise (pred_mode_flag is equal to 1), CuPredMode [x][y] is set equal to MODE_INTRA.

When pred mode_flag is not present, the variable CuPredMode[x][y] is inferred to be equal to MODE_INTRA for x=x0 . . . x0+cbWidth−1 and y=y0 . . . y0+cbHeight−1.

mmvd_flag[x0][y0] equal to 1 specifies that merge mode with motion vector difference is used to generate the inter prediction parameters of the current coding unit. The array indices x0, y0 specify the location (x0, y0) of the top-left luma sample of the considered coding block relative to the top-left luma sample of the picture.

When mmvd_flag[x0][y0] is not present, it is inferred to be equal to 0.

mmvd_merge_flag[x0][y0] specifies whether the first (0) or the second (1) candidate in the merging candidate list is used with the motion vector difference derived from mmvd_distance_idx[x0][y0] and mmvd_direction_idx[x0] [y0]. The array indices x0, y0 specify the location (x0, y0) of the top-left luma sample of the considered coding block relative to the top-left luma sample of the picture.

mmvd_distance_idx[x0][y0] specifies the index used to derive MmvdDistance[x0][y0] as specified in Table 2. The array indices x0, y0 specify the location (x0, y0) of the top-left luma sample of the considered coding block relative to the top-left luma sample of the picture.

TABLE 2

| mmvd_distance_idx[ x0 ][ y0 ] | MmvdDistance[ x0 ][ y0 ] |
|---|---|
| 0 | 1 |
| 1 | 2 |
| 2 | 4 |
| 3 | 8 |
| 4 | 16 |
| 5 | 32 |
| 6 | 64 |
| 7 | 128 | mmvd_direction_idx[x0][y0] specifies index used to derive MmvdSign[x0][y0] as specified in Table 3. The array indices x0, y0 specify the location (x0, y0) of the top-left luma sample of the considered coding block relative to the top-left luma sample of the picture.

TABLE 3

| mmvd_direction_idx [ x0 ][ y0 ] | MmvdSign [ x0 ][ y0 ][0] | MmvdSign [ x0 ][ y0 ][1] |
|---|---|---|
| 0 | +1 | 0 |
| 1 | −1 | 0 |
| 2 | 0 | +1 |
| 3 | 0 | −1 |

Both components of of the merge plus MVD offset MmvdOffset[x0][y0] are derived as follows:

MmvdOffset[x0][y0][0]=(MmvdDistance[x0][y0]<<2)*MmvdSign[x0][y0][0]

MmvdOffset[x0][y0][1]=(MmvdDistance[x0][y0]<<2)*MmvdSign[x0][y0][1]

merge_subblock_flag[x0][y0] specifies whether the subblock-based inter prediction parameters for the current coding unit are inferred from neighbouring blocks. The array indices x0, y0 specify the location (x0, y0) of the top-left luma sample of the considered coding block relative to the top-left luma sample of the picture. When merge_subblock_flag[x0][y0] is not present, it is inferred to be equal to 0.

merge_idx[x0][y0] specifies the merging candidate index of the merging candidate list where x0, y0 specify the location (x0, y0) of the top-left luma sample of the considered coding block relative to the top-left luma sample of the picture.

When merge_idx[x0][y0] is not present, it is inferred as follows:

If mmvd_flag[x0][y0] is equal to 1, merge_idx[x0][y0] is inferred to be equal to mmvd_merge_flag[x0][y0].

Otherwise (mmvd_flag[x0][y0] is equal to 0), merge_idx[x0][y0] is inferred to be equal to 0.

merge_subblock_idx[x0][y0] specifies the merging candidate index of the subblock-based merging candidate list where x0, y0 specify the location (x0, y0) of the top-left luma sample of the considered coding block relative to the top-left luma sample of the picture. When merge_subblock_idx[x0][y0] is not present, it is inferred to be equal to 0.

merge_flag[x0][y0] specifies whether the inter prediction parameters for the current coding unit are inferred from a neighbouring inter-predicted partition. The array indices x0, y0 specify the location (x0, y0) of the top-left luma sample of the considered coding block relative to the top-left luma sample of the picture.

When merge flag[x0][y0] is not present, it is inferred as follows:

If cu_skip_flag[x0][y0] is equal to 1, merge_flag[x0][y0] is inferred to be equal to 1.

Otherwise, merge_flag[x0][y0] is inferred to be equal to 0.

mh_infra_flag[x0][y0] specifies whether the combined inter-picture merge and intra-picture prediction is applied for the current coding unit. The array indices x0, y0 specify the location (x0, y0) of the top-left luma sample of the considered coding block relative to the top-left luma sample of the picture.

When mh_intraflag[x0][y0] is not present, it is inferred to be equal to 0.

The syntax elements mh_intra_luma_mpm_flag[x0][y0], and mh_intra_luma_mpm_idx[x0][y0] specify the intra prediction mode for luma samples used in combined inter-picture merge and intra-picture prediction. The array indices x0, y0 specify the location (x0 , y0) of the top-left luma sample of the considered coding block relative to the top-left luma sample of the picture. The intra prediction mode is derived according to techniques provided in JVET-L1001.

inter_pred_ide[x0][y0] specifies whether list0, list1, or hi-prediction is used for the current coding unit according to Table 4. The array indices x0, y0 specify the location (x0, y0) of the top-left luma sample of the considered coding block relative to the top-left luma sample of the picture

TABLE 4

| | Name of inter_pred_idc | |
|---|---|---|
| inter_pred_idc | ( cbWidth + cbHeight ) != 8 | ( cbWidth + cbHeight ) == 8 |
| 0 | PRED_L0 | PRED_L0 |
| 1 | PRED_L1 | PRED_L1 |
| 2 | PRED_BI | n.a. |

When inter_pred_idc[x0][y0] is not present, it is inferred to be equal to PRED_L0.

inter_affine_flag[x0][y0] equal to 1 specifies that for the current coding unit, when decoding a P or B slice, affine model based motion compensation is used to generate the prediction samples of the current coding unit. inter_affine_flag[x0][y0] equal to 0 specifies that the coding unit is not predicted by affine model based motion compensation. When inter_affine_flag[x0][y0] is not present, it is inferred to be equal to 0.

cu_affine_type_flag[x0][y0] equal to 1 specifies that for the current coding unit, when decoding a P or B slice, 6-parameter affine model based motion compensation is used to generate the prediction samples of the current coding unit. cu_affine_type_flag[x0][y0] equal to 0 specifies that 4-parameter affine model based motion compensation is used to generate the prediction samples of the current coding unit.

MotionModelIdc[x][y] represents motion model of a coding unit as illustrated in Table 5. The array indices x, y specify the luma sample location (x, y) relative to the top-left luma sample of the picture.

The variable MotionModelIdc[x][y] is derived as follows for x=x0 . . . x0+cbWidth−1 and y=y0 . . . y0+cbHeight−1:

If merge_flag[x0][y0] is equal to 1, the following applies:
MotionModelIdc[x][y]=merge_subblock_flag[x0][y0]

Otherwise (merge_flag[x0][y0] is equal to 0), the following applies:
MotionModelIdc[x][y]=inter_affine_flag[x0][y0]+cu_affine_type flag[x0][y0]

TABLE 5

| MotionModelIdc[ x ][ y ] | Motion model for motion compensation |
|---|---|
| 0 | Translational motion |
| 1 | 4-parameter affine motion |
| 2 | 6-parameter affine motion | ref_idx_l0[x0][y0] specifies the list 0 reference picture index for the current coding unit. The array indices x0, y0 specify the location (x0, y0) of the top-left luma sample of the considered coding block relative to the top-left luma sample of the picture.

When ref_idx_l0[x0][y0] is not present it is inferred to be equal to 0.

ref_idx_l1[x0][y0] has the same semantics as ref_idx_l0, with l0 and list 0 replaced by l1 and list 1, respectively.

mvp_l0_flag[x0][y0] specifies the motion vector predictor index of list 0 where x0, y0 specify the location (x0, y0) of the top-left luma sample of the considered coding block relative to the top-left luma sample of the picture.

When mvp_l0_flag[x0][y0] is not present, it is inferred to be equal to 0.

mvp_l1_flag[x0][y0] has the same semantics as mvp_l0_flag, with l0 and list 0 replaced by l1 and list 1, respectively.

amvr_mode[x0][y0] specifies the resolution of motion vector difference. The array indices x0, y0 specify the location (x0, y0) of the top-left luma sample of the considered coding block relative to the top-left luma sample of the picture.

When amvr_mode[x0][y0] is not present, it is inferred to be equal to 0.

The variable MvShift is set equal to amvr_mode[x0][y0] <<1 and the variables MvdL0[x0][y0][0], MvdL0[x0][y0][1], MvdL1[x0][y0][0], MvdL1[x0][y0][1], are modified as follows:

MvdL0[x0][y0][0]=MvdL0[x0][y0][0]=>>(MvShift+2)
MvdL0[x0][y0][1]=MvdL0[x0][y0][1]=>>(MvShift+2)
MvdL1[x0][y0][0]=MvdL1[x0][y0][0]=>>(MvShift+2)
MvdL1[x0][y0][1]=MvdL1[x0][y0][1]=>>(MvShift+2)

gbi_idx[x0][y0] specifies the weight index of bi-prediction with CU weights. The array indices x0, y0 specify the location (x0, y0) of the top-left luma sample of the considered coding block relative to the top-left luma sample of the picture.

When gbi_idx[x0][y0] is not present, it is inferred to be equal to 0.

cu_cbf equal to 1 specifies that the transform_tree( ) syntax structure is present for the current coding unit. cu_cbf equal to 0 specifies that the transform_tree( ) syntax structure is not present for the current coding unit.

When cu_cbf is not present, it is inferred as follows:

If cu_skip_flag[x0][y0] is equal to 1, cu_cbf is inferred to be equal to 0.

Otherwise, cu_cbf is inferred to be equal to 1.

The CU level syntax provided in JVET-L1001 to indicate how a particular inter prediction tool is used to generate a prediction for the current CU may be less than ideal. For example, some inter prediction tools are mutually exclusive of one another other. Thus, if one tool is signaled as ON, for example, signaling syntax elements associated another mutually exclusive inter prediction tool may be inefficient.

With respect to JVET-L1001, modifications have been proposed with respect to inter prediction tools that may be used to generate a prediction for a current CU. In particular, Table 6 illustrates the CU level syntax associated with the techniques implemented in the VVC Test Model 3 (VTM3) algorithm that is used to indicate how a particular inter prediction tool is used to generate a prediction for the current CU.

TABLE 6

| | Descriptor |
|---|---|
| coding_unit( x0, y0, cbWidth, cbHeight, treeType ) { | |
| ... | |
| } else { /* MODE_INTER */ | |
|   if( cu_skip_flag[ x0 ][ y0 ] ) { | |
|     mmvd_flag[ x0 ][ y0 ] | ae(v) |
|     if ( mmvd_flag[ x0 ][ y0 ] = = 0 && MaxNumSubblockMergeCand > 0 && cbWidth >= 8 && cbHeight >= 8 ) | |
|       merge_subblock_flag[ x0 ][ y0 ] | ae(v) |
|   } else { | |
|     merge_flag[ x0 ][ y0 ] | ae(v) |
|     if( merge_flag[ x0 ][ y0 ] ) { | |
|       mmvd_flag[ x0 ][ y0 ] | ae(v) |
|       if ( mmvd_flag[ x0 ][ y0 ] = = 0 && MaxNumSubblockMergeCand > 0 && cbWidth >= 8 && cbHeight >= 8 ) | |
|         merge_subblock_flag[ x0 ][ y0 ] | ae(v) |
|       if( mmvd_flag[ x0 ][ y0 ] = = 0 && merge_subblock_flag[ x0 ][ y0 ] = = 0 && ( cbWidth * cbHeight ) >= 64 && cbWidth < 128 && cbHeight < 128) { | |
|         mh_intra_flag[ x0 ][ y0 ] | ae(v) |
|         if( mh_intra_flag[ x0 ][ y0 ] ) { | |
|           mh_intra_luma_mpm_flag[ x0 ][ y0 ] | ae(v) |
|           if( mh_intra_luma_mpm_flag[ x0 ][ y0 ] ) | |
|             mh_intra_luma_mpm_idx[ x0 ][ y0 ] | ae(v) |
|         } | |
|       } | |
|       if ( sps_triangle_mode_flag && slice_type == B && cbWidth*cbHeight >= 64 && merge_subblock_flag[ x0 ][ y0 ] = = 0 && mmvd_flag[ x0 ][ y0 ] = = 0 && mh_intra_flag[ x0 ][ y0 ] = = 0 ) | |
|         triangle_mode_flag[ x0 ][ y0 ] | ae(v) |
|     if ( cu_skip_flag[ x0 ][ y0 ] || merge_flag[ x0 ][ y0 ] { | |
|       if( mmvd_flag[ x0 ][ y0 ] = = 1 ) { | |

TABLE 6-continued

| | Descriptor |
|---|---|
|            mmvd_merge_flag[ x0 ][ y0 ] | ae(v) |
|            mmvd_distance_idx[ x0 ][ y0 ] | ae(v) |
|            mmvd_direction_idx[ x0 ][ y0 ] | ae(v) |
|         } else { | |
|           if( merge_subblock_flag[ x0 ][ y0] = = 0 && triangle_mode_flag[ x0 ][ y0 ] | |
|             triangle_merge_idx[ x0 ][ y0 ] | ae(v) |
|           else( merge_subblock_flag[ x0 ][ y0 ] = = 0 && MaxNumMergeCand > 1 ) | |
|             merge_idx[ x0 ][ y0 ] | ae(v) |
|           if( merge_subblock_flag[ x0 ][ y0 ] = = 1 && MaxNumSubblockMergeCand > 1 ) | |
|             merge_subblock_idx[ x0 ][ y0 ] | ae(v) |
|         } | |
|       } | |
|     } else { | |
|       if( slice_type = = B ) | |
|         inter_pred_idc[ x0 ][ y0 ] | ae(v) |
|       if( sps_affine_enabled_flag && cbWidth >=16 && cbHeight >= 16 ) { | |
|         inter_affine_flag[ x0 ][ y0 ] | ae(v) |
|         if( sps_affine_type_flag && inter_affine_flag[ x0 ][ y0 ] ) | |
|           cu_affine_type_flag[ x0 ][ y0 ] | ae(v) |
|       } | |
|       if( inter_pred_idc[ x0 ][ y0 ] != PRED_L1 ) { | |
|         if( num_ref_idx_l0_active_minus1 > 0 ) | |
|           ref_idx_l0[ x0 ][ y0 ] | ae(v) |
|         mvd_coding( x0, y0, 0, 0 ) | |
|         if( MotionModelIdc[ x0 ][ y0 ] > 0 ) | |
|           mvd_coding( x0, y0, 0, 1 ) | |
|         if(MotionModelIdc[ x0 ][ y0 ] > 1 ) | |
|           mvd_coding( x0, y0, 0, 2 ) | |
|         mvp_l0_flag[ x0 ][ y0 ] | ae(v) |
|       } else { | |
|         MvdL0[ x0 ][ y0 ][ 0 ] = 0 | |
|         MvdL0[ x0 ][ y0 ][ 1 ] = 0 | |
|       } | |
|       if( inter_pred_idc[ x0 ][ y0 ] != PRED_L0 ) { | |
|         if( num_ref_idx_l1_active_minus1 > 0 ) | |
|           ref_idx_l1[ x0 ][ y0 ] | ae(v) |
|         if( mvd_l1_zero_flag && inter_pred_idc[ x0 ][ y0 ] = = PRED_BI ) { | |
|           MvdL1[ x0 ][ y0 ][ 0 ] = 0 | |
|           MvdL1[ x0 ][ y0 ][ 1 ] = 0 | |
|           MvdCpL1[ x0 ][ y0 ][ 0 ][ 0 ] = 0 | |
|           MvdCpL1[ x0 ][ y0 ][ 0 ][ 1 ] = 0 | |
|           MvdCpL1[ x0 ][ y0 ][ 1 ][ 0 ] = 0 | |
|           MvdCpL1[ x0 ][ y0 ][ 1 ][ 1 ] = 0 | |
|           MvdCpL1[ x0 ][ y0 ][ 2 ][ 0 ] = 0 | |
|           MvdCpL1[ x0 ][ y0 ][ 2 ][ 1 ] = 0 | |
|         } else { | |
|           mvd_coding( x0, y0, 1, 0 ) | |
|         if( MotionModelIdc[ x0 ][ y0 ] > 0 ) | |
|           mvd_coding( x0, y0, 1, 1 ) | |
|         if(MotionModelIdc[ x0 ][ y0 ] > 1 ) | |
|           mvd_coding( x0, y0, 1, 2 ) | |
|         mvp_l1flag[ x0 ][ y0 ] | ae(v) |
|       } else { | |
|         MvdL1[ x0 ][ y0 ][ 0 ] = 0 | |
|         MvdL1[ x0 ][ y0 ][ 1 ] = 0 | |
|       } | |
|       if( sps_amvr_enabled_flag && inter_affine_flag = = 0 && ( MvdL0[ x0 ][ y0 ][ 0 ] != 0 \|\| MvdL0[ x0 ][ y0 ][ 1 ] != 0 \|\| MvdL1[ x0 ][ y0 ][ 0 ] != 0 \|\| MvdL1[ x0 ][ y0 ][ 1 ] != 0 ) ) | |
|         amvr_mode[ x0 ][ y0 ] | ae(v) |
|       if( sps_gbi_enabled_flag && inter_pred_idc[ x0 ][ y0 ] = = PRED_BI && cbWidth * cbHeight >= 256 ) | |
|         gbi_idx[ x0 ][ y0 ] | ae(v) |
|     } | |
|   } | |
| } | |

TABLE 6-continued

| | Descriptor |
|---|---|
| if( !pcm_flag[ x0 ][ y0 ] ) {<br>  if( CuPredMode[ x0 ][ y0 ] != MODE_INTRA &&<br>cu_skip_flag[ x0 ][ y0 ] = = 0 )<br>    cu_cbf<br>  if( cu_cbf )<br>    transform_tree( x0, y0, cbWidth, cbHeight, treeType )<br>  }<br>} | ae(v) |

With respect to Table 6, the definitions of the respective syntax elements may be as provided above and as follows:

triangle_mode_flag[x0][y0] specifies whether the triangle mode prediction (As described in "CE10.3.1.b: Triangular prediction unit mode," 12th Meeting of ISO/IEC JTC1/SC29/WG11 3-12 Oct. 2018, Macao, CN, document JVET-L0124-v2, which is referred herein as JVET-L0124) is used for the current coding block. The array indices x0, y0 specify the location (x0, y0) of the top-left luma sample of the considered coding block relative to the top-left luma sample of the picture. When triangle_mode_flag[x0][y0] is not present, it is inferred to be equal to 0.

triangle_merge_idx[x0][y0] specifies the merging candidate index of the triangle mode merging candidate list where x0, y0 specify the location (x0, y0) of the top-left luma sample of the considered coding block relative to the top-left luma sample of the picture. When triangle_merge_idx[x0][y0] is not present, it is inferred to be equal to 0.

Thus, the syntax illustrated in Table 6 supports the inter prediction tool of triangle mode prediction. Similar to the CU level syntax provided in JVET-L1001, the CU level syntax corresponding to the VTM3 algorithm may be less than ideal.

Figure 5:
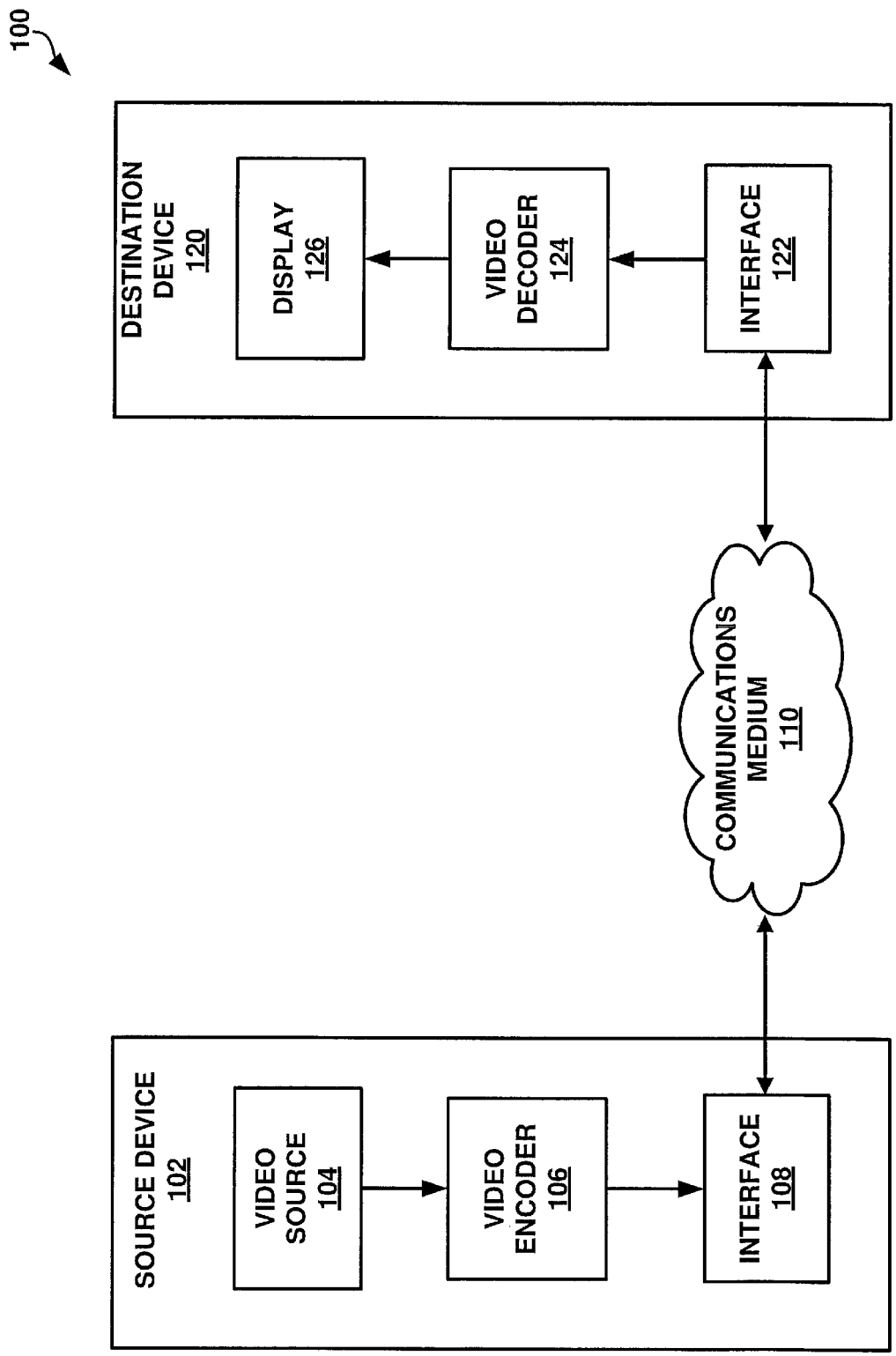
FIG. 5 is a block diagram illustrating an example of a system that may be configured to encode and decode video data, in accordance with one or more techniques of this disclosure.

FIG. 5 is a block diagram illustrating an example of a system that may be configured to code (e.g., encode and/or decode) video data, according to one or more techniques of this disclosure. System 100 represents an example of a system that may perform video coding using motion vector prediction techniques described according to one or more examples of this disclosure. As illustrated in FIG. 5, system 100 includes source device 102, communications medium 110, and destination device 120. In the example illustrated in FIG. 5, source device 102 may include any device configured to encode video data and transmit encoded video data to communications medium 110. Destination device 120 may include any device configured to receive encoded video data via communications medium 110 and to decode encoded video data. Source device 102 and/or destination device 120 may include computing devices equipped for wired and/or wireless communications and may include set top boxes, digital video recorders, televisions, desktop, laptop, or tablet computers, gaming consoles, mobile devices, including, for example, "smart" phones, cellular telephones, personal gaming devices, and medical imagining devices.

Communications medium 110 may include any combination of wireless and wired communication media, and/or storage devices. Communications medium 110 may include coaxial cables, fiber optic cables, twisted pair cables, wireless transmitters and receivers, routers, switches, repeaters, base stations, or any other equipment that may be useful to facilitate communications between various devices and sites. Communications medium 110 may include one or more networks. For example, communications medium 110 may include a network configured to enable access to the World Wide Web, for example, the Internet. A network may operate according to a combination of one or more telecommunication protocols. Telecommunications protocols may include proprietary aspects and/or may include standardized telecommunication protocols. Examples of standardized telecommunications protocols include Digital Video Broadcasting (DVB) standards, Advanced Television Systems Committee (ATSC) standards, Integrated Services Digital Broadcasting (ISDB) standards, Data Over Cable Service Interface Specification (DOCSIS) standards, Global System Mobile Communications (GSM) standards, code-division multiple access (CDMA) standards, 3rd Generation Partnership Project (3GPP) standards, European Telecommunications Standards Institute (ET SI) standards, Internet Protocol (IP) standards, Wireless Application Protocol (WAP) standards, and Institute of Electrical and Electronics Engineers (IEEE) standards.

Storage devices may include any type of device or storage medium capable of storing data. A storage medium may include a tangible or non-transitory computer-readable media. A computer-readable medium may include optical discs, flash memory, magnetic memory, or any other suitable digital storage media. In some examples, a memory device or portions thereof may be described as non-volatile memory and in other examples portions of memory devices may be described as volatile memory. Examples of volatile memories may include random-access memories (RAM), dynamic random-access memories (DRAM), and static random-access memories (SRAM). Examples of non-volatile memories may include magnetic hard discs, optical discs, floppy discs, flash memories, or forms of electrically programmable memories (EPROM) or electrically erasable and programmable (EEPROM) memories. Storage device(s) may include memory cards (e.g., a Secure Digital (SD) memory card), internal/external hard disk drives, and/or internal/external solid state drives. Data may be stored on a storage device according to a defined file format.

Referring again to FIG. 5, source device 102 includes video source 104, video encoder 106, and interface 108. Video source 104 may include any device configured to capture and/or store video data. For example, video source 104 may include a video camera and a storage device operably coupled thereto. Video encoder 106 may include any device configured to receive video data and generate a compliant bitstream representing the video data. A compliant bitstream may refer to a bitstream that a video decoder can receive and reproduce video data therefrom. Aspects of a compliant bitstream may be defined according to a video coding standard. When generating a compliant bitstream video encoder 106 may compress video data. Compression may be lossy (discernible or indiscernible) or lossless. Interface 108 may include any device configured to receive a compliant video bitstream and transmit and/or store the compliant video bitstream to a communications medium. Interface 108 may include a network interface card, such as an Ethernet card, and may include an optical transceiver, a radio frequency transceiver, or any other type of device that can send and/or receive information. Further, interface 108 may include a computer system interface that may enable a compliant video bitstream to be stored on a storage device. For example, interface 108 may include a chipset supporting Peripheral Component Interconnect (PCI) and Peripheral Component Interconnect Express (PCIe) bus protocols, proprietary bus protocols, Universal Serial Bus (USB) protocols, $I^2C$, or any other logical and physical structure that may be used to interconnect peer devices.

Referring again to FIG. 5, destination device 120 includes interface 122, video decoder 124, and display 126. Interface 122 may include any device configured to receive a compliant video bitstream from a communications medium. Interface 108 may include a network interface card, such as an Ethernet card, and may include an optical transceiver, a radio frequency transceiver, or any other type of device that can receive and/or send information. Further, interface 122 may include a computer system interface enabling a compliant video bitstream to be retrieved from a storage device. For example, interface 122 may include a chipset supporting PCI and PCIe bus protocols, proprietary bus protocols, USB protocols, $I^2C$, or any other logical and physical structure that may be used to interconnect peer devices. Video decoder 124 may include any device configured to receive a compliant bitstream and/or acceptable variations thereof and reproduce video data therefrom. Display 126 may include any device configured to display video data. Display 126 may include one of a variety of display devices such as a liquid crystal display (LCD), a plasma display, an organic light-emitting diode (OLED) display, or another type of display. Display 126 may include a High-Definition display or an Ultra-High-Definition display. It should be noted that although in the example illustrated in FIG. 5, video decoder 124 is described as outputting data to display 126, video decoder 124 may be configured to output video data to various types of devices and/or sub-components thereof. For example, video decoder 124 may be configured to output video data to any communication medium, as described herein.

Figure 6:
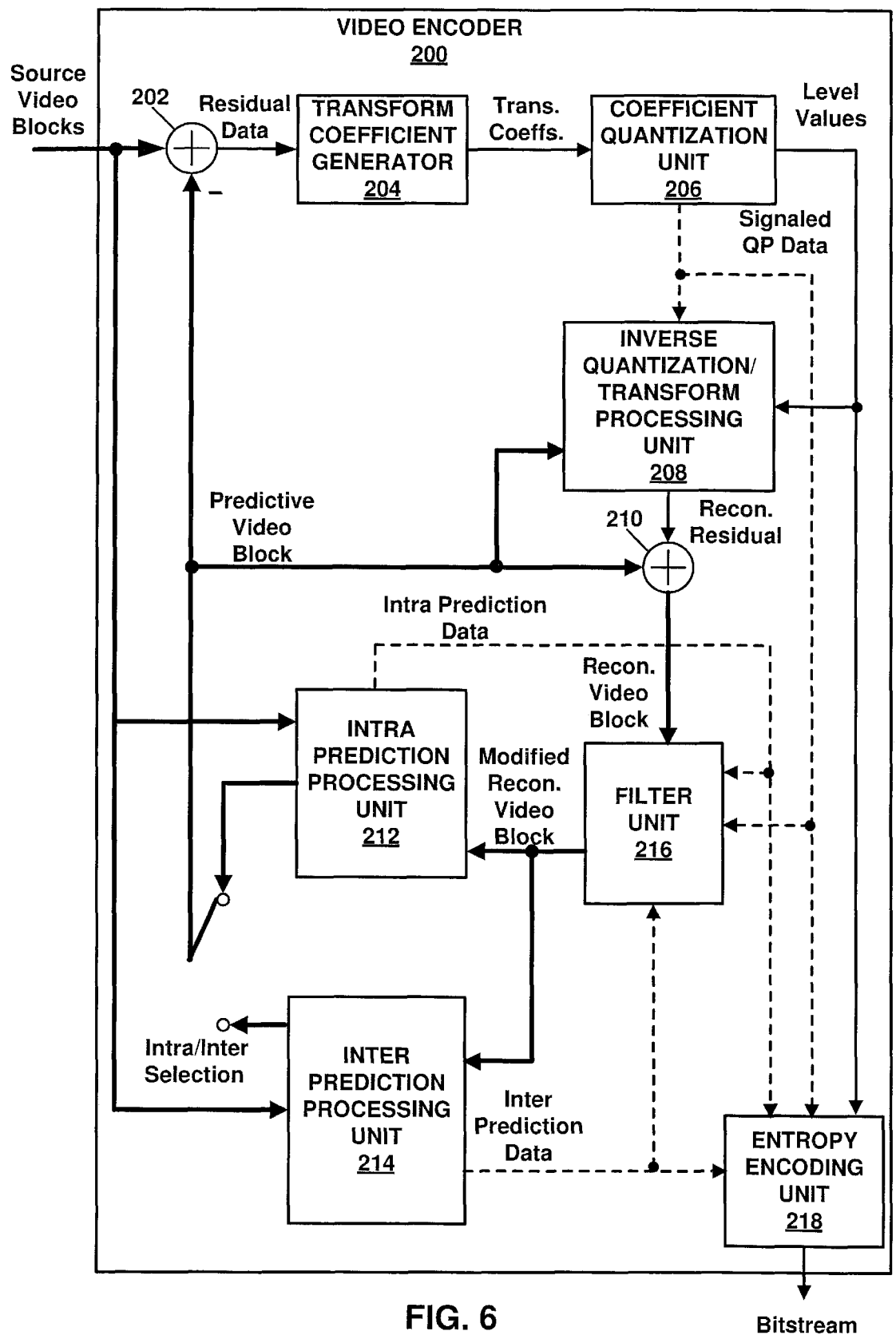
FIG. 6 is a block diagram illustrating an example of a video encoder that may be configured to encode video data, in accordance with one or more techniques of this disclosure.

FIG. 6 is a block diagram illustrating an example of video encoder 200 that may be configured to encode video data, in accordance with one or more techniques of this disclosure. It should be noted that although example video encoder 200 is illustrated as having distinct functional blocks, such an illustration is for descriptive purposes and does not limit video encoder 200 and/or sub-components thereof to a particular hardware or software architecture. Functions of video encoder 200 may be realized using any combination of hardware, firmware, and/or software implementations. In one example, video encoder 200 may be configured to encode video data according to the techniques described herein. Video encoder 200 may perform intra prediction coding and inter prediction coding of picture areas, and, as such, may be referred to as a hybrid video encoder. In the example illustrated in FIG. 6, video encoder 200 receives source video blocks. In some examples, source video blocks may include areas of picture that has been divided according to a coding structure. For example, source video data may include macroblocks, CTUs, CBs, sub-divisions thereof, and/or another equivalent coding unit. In some examples, video encoder 200 may be configured to perform additional sub-divisions of source video blocks. It should be noted that some techniques described herein may be generally applicable to video coding, regardless of how source video data is partitioned prior to and/or during encoding. In the example illustrated in FIG. 6, video encoder 200 includes summer 202, transform coefficient generator 204, coefficient quantization unit 206, inverse quantization/transform processing unit 208, summer 210, intra prediction processing unit 212, inter prediction processing unit 214, filter unit 216, and entropy encoding unit 218.

As illustrated in FIG. 6, video encoder 200 receives source video blocks and outputs a bitstream. Video encoder 200 may generate residual data by subtracting a predictive video block from a source video block. Summer 202 represents a component configured to perform this subtraction operation. In one example, the subtraction of video blocks occurs in the pixel domain. Transform coefficient generator 201 applies a transform, such as a discrete cosine transform (DCT), a discrete sine transform (DST), or a conceptually similar transform, to the residual block or sub-divisions thereof (e.g., four 8×8 transforms may be applied to a 16×16 array of residual values) to produce a set of residual transform coefficients. Transform coefficient generator 204 may be configured to perform any and all combinations of the transforms included in the family of discrete trigonometric transforms. Transform coefficient generator 204 may output transform coefficients to coefficient quantization unit 206. Coefficient quantization unit 206 may be configured to perform quantization of the transform coefficients. As described above, the degree of quantization may be modified by adjusting a quantization parameter. Coefficient quantization unit 206 may be further configured to determine quantization parameters (QP) and output QP data (e.g., data used to determine a quantization group size and/or delta QP values) that may be used by a video decoder to reconstruct a quantization parameter to perform inverse quantization during video decoding. It should be noted that in other examples, one or more additional or alternative parameters may be used to determine a level of quantization (e.g., scaling factors). The techniques described herein may be generally applicable to determining a level of quantization for transform coefficients corresponding to a component of video data based on a level of quantization for transform coefficients corresponding another component of video data.

As illustrated in FIG. 6, quantized transform coefficients are output to inverse quantization/transform processing unit 208. Inverse quantization/transform processing unit 208 may be configured to apply an inverse quantization and an inverse transformation to generate reconstructed residual data. As illustrated in FIG. 6, at summer 210, reconstructed residual data may be added to a predictive video block. In this manner, an encoded video block may be reconstructed and the resulting reconstructed video block may be used to evaluate the encoding quality for a given prediction, transformation, and/or quantization. Video encoder 200 may be configured to perform multiple coding passes (e.g., perform encoding while varying one or more of a prediction, transformation parameters, and quantization parameters). The rate-distortion of a bitstream or other system parameters may be optimized based on evaluation of reconstructed video blocks. Further, reconstructed video blocks may be stored and used as reference for predicting subsequent blocks.

As described above, a video block may be coded using an intra prediction mode. Intra prediction processing unit 212 may be configured to select an intra prediction mode for a current video block. Intra prediction processing unit 212 may be configured to evaluate a frame and/or an area thereof and determine an intra prediction mode to use to encode a current block. As illustrated in FIG. 6, intra prediction processing unit 212 outputs intra prediction data (e.g., syntax elements) to entropy encoding unit 218 and transform coefficient generator 204. As described above, possible intra prediction modes may include planar prediction modes, DC prediction modes, and angular prediction modes. Inter prediction processing unit 214 may be configured to perform inter prediction coding for a current video block. Inter prediction processing unit 214 may be configured to receive source video blocks and calculate motion information for PUs of a video block. A motion vector may indicate the displacement of a PU (or similar coding structure) of a video block within a current video frame relative to a predictive block within a reference frame. Inter prediction coding may use one or more reference pictures. For example, inter prediction processing unit 214 may locate a predictive video block within a frame buffer (not shown in FIG. 6). It should be noted that inter prediction processing unit 214 may further be configured to apply one or more interpolation filters to a reconstructed residual block to calculate sub-integer pixel values for use in motion estimation. Further, motion prediction may be uni-predictive (use one motion vector) or bi-predictive (use two motion vectors). Inter prediction processing unit 214 may be configured to select a predictive block by calculating a pixel difference determined by, for example, sum of absolute difference (SAD), sum of square difference (SSD), or other difference metrics. Inter prediction processing unit 214 may output motion prediction data for a calculated motion vector to entropy encoding unit 218.

As described above, motion information may be determined and specified according to motion vector prediction techniques. Inter prediction processing unit 214 may be configured to perform motion vector prediction techniques, including for example, those described above. Further, inter prediction processing unit 214 may be configured to perform motion vector prediction according to techniques described above. In particular, inter prediction processing unit 214 may be configured to perform sub-block-based motion vector prediction.

As described above, the CU level syntax in JVET-L1001 and the CU level syntax corresponding to the VTM3 algorithm may be less than ideal. In one example, according to the techniques herein, mmvd_merge_flag is only signaled if non sub PU merge mode is selected (i.e., when merge_subblock_flag is 0). Table 7 illustrates an example where mmvd_merge_flag is only signaled if non sub PU merge mode is selected according to the techniques herein. As illustrated in the syntax of Table 7, the signaling of mmvd_merge_flag is moved below the reception of merge_subblock_flag compared to the syntax in Table 1.

TABLE 7

| | Descriptor |
|---|---|
| coding_unit( x0, y0, cbWidth, cbHeight, treeType ) { | |
| ... | |
|   } else { /* MODE_INTER */ | |
|     if( cu_skip_flag[ x0 ][ y0 ] ) { | |
|       if( MaxNumSubblockMergeCand > 0 && cbWidth >= 8 && cbHeight >= 8 ) | |
|         merge_subblock_flag[ x0 ][ y0 ] | ae(v) |
|       if( merge_subblock_flag[ x0 ][ y0 ] = = 0 ) | |
|         mmvd_flag[ x0 ][ y0 ] | ae(v) |
|       if( mmvd_flag[ x0 ][ y0 ] = = 1 ) { | |
|         mmvd_merge_flag[ x0 ][ y0 ] | ae(v) |
|         mmvd_distance_idx[ x0 ][ y0 ] | ae(v) |
|         mmvd_direction_idx[ x0 ][ y0 ] | ae(v) |
|       } else { | |
|         if( merge_subblock_flag[ x0 ][ y0 ] = = 0 && MaxNumMergeCand > 1 ) | |
|           merge_idx[ x0 ][ y0 ] | ae(v) |
|         if( merge_subblock_flag[ x0 ][ y0 ] = = 1 && MaxNumSubblockMergeCand > 1 ) | |
|           merge_subblock_idx[ x0 ][ y0 ] | ae(v) |
|       } | |
|     } else { | |
|       merge_flag[ x0 ][ y0 ] | ae(v) |
|       if( merge_flag[ x0 ][ y0 ] ) { | |
|         if( MaxNumSubblockMergeCand > 0 && cbWidth >= 8 && cbHeight >= 8 ) | |
|           merge_subblock_flag[ x0 ][ y0 ] | ae(v) |
|         if( merge_subblock_flag[ x0 ][ y0 ] = = 0 ) | |
|           mmvd_flag[ x0 ][ y0 ] | ae(v) |
|         if( mmvd_flag[ x0 ][ y0 ] = = 1 ) { | |
|           mmvd_merge_flag[ x0 ][ y0 ] | ae(v) |
|           mmvd_distance_idx[ x0 ][ y0 ] | ae(v) |
|           mmvd_direction_idx[ x0 ][ y0 ] | ae(v) |
|         } else { | |
|           if( merge_subblock_flag[ x0 ][ y0 ] = = 0 && MaxNumMergeCand > 1 ) | |
|             merge_idx[ x0 ][ y0 ] | ae(v) |
|           if( merge_subblock_flag[ x0 ][ y0 ] = = 1 && MaxNumSubblockMergeCand > 1 ) | |
|             merge_subblock_idx[ x0 ][ y0 ] | ae(v) |
|         } | |
|       if( mmvd_flag[ x0 ][ y0 ] = = 0 && merge_subblock_flag[ x0 ][ y0 ] = = 0 && ( cbWidth * cbHeight ) >= 64 && cbWidth < 128 && cbHeight < 128 ) { | |

TABLE 7-continued

|  | Descriptor |
|---|---|
| mh_intra_flag[ x0 ][ y0 ] | ae(v) |
| if( mh_intra_flag[ x0 ][ y0 ] ) { |  |
|   mh_intra_luma_mpm_flag[ x0 ][ y0 ] | ae(v) |
|   if( mh_intra_luma_mpm_flag[ x0 ][ y0 ] ) |  |
|     mh_intra_luma_mpm_idx[ x0 ][ y0 ] | ae(v) |
|   } |  |
| } |  |
| } else { |  |
| ... |  |
| } |  |

With respect to Table 7, the definitions of the respective syntax elements may be as provided above.

Table 8 illustrates an example where mmvd_merge_flag is only signaled if non sub PU merge mode is selected according to the techniques herein. As illustrated in the syntax of Table 8, the signaling of mmvd_merge_flag is moved below the reception of merge_subblock_flag compared to the syntax in Table 6.

TABLE 8

|  | Descriptor |
|---|---|
| coding_unit( x0, y0, cbWidth, cbHeight, treeType ) { |  |
| ... |  |
|   } else { /* MODE_INTER */ |  |
|     if( cu_skip_flag[ x0 ][ y0 ] ) { |  |
|       if (MaxNumSubblockMergeCand > 0 && cbWidth >= 8 && cbHeight >= 8 ) |  |
|         merge_subblock_flag[ x0 ][ y0 ] | ae(v) |
|       if ( merge_subblock_flag[ x0 ][ y0 ] = = 0 ) |  |
|         mmvd_flag[ x0 ][ y0 ] | ae(v) |
|     } else { |  |
|       merge_flag[ x0 ][ y0 ] | ae(v) |
|       if( merge_flag[ x0 ][ y0 ] ) { |  |
|         if (MaxNumSubblockMergeCand > 0 && cbWidth >= 8 && cbHeight >= 8 ) |  |
|           merge_subblock_flag[ x0 ][ y0 ] | ae(v) |
|         if ( merge_subblock_flag[ x0 ][ y0 ] = = 0 ) |  |
|           mmvd_flag[ x0 ][ y0 ] | ae(v) |
|         if( mmvd_flag[ x0 ][ y0 ] = = 0 && merge_subblock_flag[ x0 ][ y0 ] = = 0 && |  |
|         ( cbWidth * cbHeight ) >= 64 && cbWidth < 128 && cbHeight < 128 ) { |  |
|           mh_intra_flag[ x0 ][ y0 ] | ae(v) |
|           if( mh_intra_flag[ x0 ][ y0 ] ) { |  |
|             mh_intra_luma_mpm_flag[ x0 ][ y0 ] | ae(v) |
|             if( mh_intra_luma_mpm flag[ x0 ][ y0 ] ) |  |
|               mh_intra_luma_mpm_idx[ x0 ][ y0 ] | ae(v) |
|           } |  |
|         } |  |
|         if ( sps_triangle_mode_flag && slice_type == B && cbWidth*cbHeight >= 64 && merge_subblock_flag[ x0 ][ y0 ] = = 0 && mmvd_flag[ x0 ][ y0 ] = = 0 && mh_intra_flag[ x0 ][ y0 ] = = 0 ) |  |
|           triangle_mode_flag[ x0 ][ y0 ] | ae(v) |
|         if ( cu_skip_flag[ x0 ][ y0 ] merge_flag[ x0 ][ y0 ] { |  |
|           if( mmvd_flag[ x0 ][ y0 ] = = 1 ) { |  |
|             mmvd_merge_flag[ x0 ][ y0 ] | ae(v) |
|             mmvd_distance_idx[ x0 ][ y0 ] | ae(v) |
|             mmvd_direction_idx[ x0 ][ y0 ] | ae(v) |
|           } else { |  |
|             if( merge_subblock_flag[ x0 ][ y0 ] = = 0 && triangle_mode_flag[ x0 ][ y0 ] |  |
|               triangle_merge_idx[ x0 ][ y0 ] | ae(v) |
|             else( merge_subblock_flag[ x0 ][ y0 ] = = 0 && MaxNumMergeCand > 1 ) |  |
|               merge_idx[ x0 ][ y0 ] | ae(v) |
|             if( merge_subblock_flag[ x0 ][ y0 ] = = 1 && MaxNumSubblockMergeCand > 1 ) |  |
|               merge_subblock_idx[ x0 ][ y0 ] | ae(v) |
|           } |  |
|         } |  |
|       } else { |  |
|         ... |  |
|       } |  |

With respect to Table 8, the definitions of the respective syntax elements may be as provided above.

In one example, according to the techniques herein, the combined inter-picture merge and intra-picture prediction signaling is mirrored in the if(cu_skip_flag[x0][y0]){ . . . } branch. This allows the use of multi-hypothesis prediction when skip mode is used, which may improve coding efficiency. Table 9 illustrates an example where the combined inter-picture merge and intra-picture prediction signaling is mirrored in the if(cu_skip_flag[x0][y0]){ . . . } branch compared to the syntax in Table 1. Table 10 illustrates an example where the combined inter-picture merge and intra-picture prediction signaling is mirrored in the if(cu_skip_flag[x0][y0]){ . . . } branch compared to the syntax in Table 6.

TABLE 9

| | Descriptor |
|---|---|
| coding_unit( x0, y0, cbWidth, cbHeight, treeType ) { | |
| ... | |
|   } else { /* MODE_INTER */ | |
|     if( cu_skip_flag[ x0 ][ y0 ] ) { | |
|       mmvd_flag[ x0 ][ y0 ] | ae(v) |
|       if( mmvd_flag[ x0 ][ y0 ] = = 1 ) { | |
|         mmvd_merge_flag[ x0 ][ y0 ] | ae(v) |
|         mmvd_distance_idx[ x0 ][ y0 ] | ae(v) |
|         mmvd_direction_idx[ x0 ][ y0 ] | ae(v) |
|       } else { | |
|         if( MaxNumSubblockMergeCand > 0 && cbWidth >= 8 && cbHeight >= 8 ) | |
|           merge_subblock_flag[ x0 ][ y0 ] | ae(v) |
|         if( merge_subblock_flag[ x0 ][ y0 ] = = 0 && MaxNumMergeCand > 1 ) | |
|           merge_idx[ x0 ][ y0 ] | ae(v) |
|         if( merge_subblock_flag[ x0 ][ y0 ] = = 1 && MaxNumSubblockMergeCand > 1 ) | |
|           merge_subblock_idx[ x0 ][ y0 ] | ae(v) |
|       } | |
|       if( mmvd_flag[ x0 ][ y0 ] = = 0 && merge_subblock_flag[ x0 ][ y0 ] = = 0 && | |
|         ( cbWidth * cbHeight ) >= 64 && cbWidth < 128 && cbHeight < 128 ) { | |
|         mh_intra_flag[ x0 ][ y0 ] | ae(v) |
|         if( mh_intra_flag[ x0 ][ y0 ] ) { | |
|           mh_intra_luma_mpm_flag[ x0 ][ y0 ] | ae(v) |
|           if( mh_intra_luma_mpm_flag[ x0 ][ y0 ] ) | |
|             mh_intra_luma_mpm_idx[ x0 ][ y0 ] | ae(v) |
|         } | |
|       } | |
|     } else { | |
|       merge_flag[ x0 ][ y0 ] | ae(v) |
|       if( merge_flag[ x0 ][ y0 ] ) { | |
|         mmvd_flag[ x0 ][ y0 ] | ae(v) |
|         if( mmvd_flag[ x0 ][ y0 ] = = 1 ) { | |
|           mmvd_merge_flag[ x0 ][ y0 ] | ae(v) |
|           mmvd_distance_idx[ x0 ][ y0 ] | ae(v) |
|           mmvd_direction_idx[ x0 ][ y0 ] | ae(v) |
|         } else { | |
|           if( MaxNumSubblockMergeCand > 0 && cbWidth >= 8 && cbHeight >= 8 ) | |
|             merge_subblock_flag[ x0 ][ y0 ] | ae(v) |
|           if( merge_subblock_flag[ x0 ][ y0 ] = = 0 && MaxNumMergeCand > 1 ) | |
|             merge_idx[ x0 ][ y0 ] | ae(v) |
|           if( merge_subblock_flag[ x0 ][ y0 ] = = 1 && | |
|             MaxNumSubblockMergeCand > 1 ) | |
|             merge_subblock_idx[ x0 ][ y0 ] | ae(v) |
|         } | |
|         if( mmvd_flag[ x0 ][ y0 ] = = 0 && merge_subblock_flag[ x0 ][ y0 ] = = 0 && | |
|           ( cbWidth * cbHeight ) >= 64 && cbWidth < 128 && cbHeight < 128 ) { | |
|           mh_intra_flag[ x0 ][ y0 ] | ae(v) |
|           if( mh_intra_flag[ x0 ][ y0 ] ) { | |
|             mh_intra_luma_mpm_flag[ x0 ][ y0 ] | ae(v) |
|             if( mh_intra_luma_mpm_flag[ x0 ][ y0 ] ) | |
|               mh_intra_luma_mpm_idx[ x0 ][ y0 ] | ae(v) |
|           } | |
|         } | |
|       } else { | |
|         ... | |
|       } | |

TABLE 10

| | Descriptor |
|---|---|
| coding_unit( x0, y0, cbWidth, cbHeight, treeType ) { | |
| ... | |
| } else { /* MODE_INTER */ | |
|   if( cu_skip_flag[ x0 ][ y0 ] ) { | |
|     mmvd_flag[ x0 ][ y0 ] | ae(v) |
|     if ( mmvd_flag[ x0 ][ y0 ] = = 0 && MaxNumSubblockMergeCand > 0 && cbWidth >= 8 && cbHeight >= 8 ) | |
|       merge_subblock_flag[ x0 ][ y0 ] | ae(v) |
|     if( mmvd_flag[ x0 ][ y0 ] = = 0 && merge_subblock_flag[ x0 ][ y0 ] = = 0 && | |
|       ( cbWidth * cbHeight ) >= 64 && cbWidth < 128 && cbHeight < 128 ) { | |
|       mh_intra_flag[ x0 ][ y0 ] | ae(v) |
|       if( mh_intra_flag[ x0 ][ y0 ] ) { | |
|         mh_intra_luma_mpm_flag[ x0 ][ y0 ] | ae(v) |
|         if( mh_intra_luma_mpm_flag[ x0 ][ y0 ] ) | |
|           mh_intra_luma_mpm_idx[ x0 ][ y0 ] | ae(v) |
|       } | |
|     } | |
|   } else { | |
|     merge_flag[ x0 ][ y0 ] | ae(v) |
|     if( merge_flag[ x0 ][ y0 ] ) { | |
|       mmvd_flag[ x0 ][ y0 ] | ae(v) |
|       if ( mmvd_flag[ x0 ][ y0 ] = = 0 && MaxNumSubblockMergeCand > 0 && cbWidth >= 8 && cbHeight >= 8 ) | |
|         merge_subblock_flag[ x0 ][ y0 ] | ae(v) |
|       if( mmvd_flag[ x0 ][ y0 ] = = 0 && merge_subblock_flag[ x0 ][ y0 ] = = 0 && | |
|         ( cbWidth * cbHeight ) >= 64 && cbWidth < 128 && cbHeight < 128 ) { | |
|         mh_intra_flag[ x0 ][ y0 ] | ae(v) |
|         if( mh_intra_flag[ x0 ][ y0 ] ) { | |
|           mh_intra_luma_mpm_flag[ x0 ][ y0 ] | ae(v) |
|           if( mh_intra_luma_mpm_flag[ x0 ][ y0 ] ) | |
|             mh_intra_luma_mpm_idx[ x0 ][ y0 ] | ae(v) |
|         } | |
|       } | |
|       if ( sps_triangle_mode_flag && slice_type == B && cbWidth*cbHeight >= 64 && merge_subblock_flag[ x0 ][ y0 ] = = 0 && mmvd_flag[ x0 ][ y0 ] = = 0 && mh_intra_flag[ x0 ][ y0 ] = = 0 ) | |
|         triangle_mode_flag[ x0 ][ y0 ] | ae(v) |
|       if ( cu_skip_flag[ x0 ][ y0 ] || merge_flag[ x0 ][ y0 ] { | |
|         if( mmvd_flag[ x0 ][ y0 ] = = 1 ) { | |
|           mmvd_merge_flag[ x0 ][ y0 ] | ae(v) |
|           mmvd_distance_idx[ x0 ][ y0 ] | ae(v) |
|           mmvd_direction_idx[ x0 ][ y0 ] | ae(v) |
|         } else { | |
|           if( merge_subblock_flag[ x0 ][ y0 ] = = 0 && triangle_mode_flag[ x0 ][ y0 ] ) | |
|             triangle_merge_idx[ x0 ][ y0 ] | ae(v) |
|           else( merge_subblock_flag[ x0 ][ y0 ] = = 0 && MaxNumMergeCand > 1 ) | |
|             merge_idx[ x0 ][ y0 ] | ae(v) |
|           if( merge_subblock_flag[ x0 ][ y0 ] = = 1 && MaxNumSubblockMergeCand > 1 ) | |
|             merge_subblock_idx[ x0 ][ y0 ] | ae(v) |
|         } | |
|       } | |
|     } else { | |
|       ... | |
| } | |

With respect to Table 9 and Table 10, the definitions of the respective syntax elements may be as provided above.

In one example, according to the techniques herein, the following condition for the signaling combined inter-picture merge and intra-picture prediction (i.e., the multi-hypothesis prediction) signaling:

if(mmvd_flag[x0][y0]==0&&merge_subblock_flag[x0][y0]==0&& (cbWidth*cbHeight)>= 64&&cbWidth<128&&cbHeight<128){ may be further conditioned on a high level flag (i.e., a flag at a higher level than the CU level) as follows:

if(sps_mh_intra_flag&&mmvd_flag[x0][y0]==0&& merge_subblock_flag[x0][y0]==0&&(cbWidth cbHeight)>=64&&cbWidth<128&&cbHeight<128){

Further, in one example, according to the techniques herein, a high level flag may indicate whether one of the multi-hypothesis prediction signaling or triangle mode signaling is signaled. That is, the following conditions:

if(mmvd_flag[x0][y0]==0&&merge_subblock_flag[x0][y0]==0&& (cbWidth* cbHeight)>=64&&cbWidth<128&&cbHeight<128)

{
AND
if (sps_triangle_mode_flag&&slice_type==B&&cbWidth*cbHeight>=64&& merge_subblock_flag[x0][y0]==0&&mmvd_flag[x0][y0]==0&& mh_intra_flag[x0][y0]==0)
may be modified as follows:
if(use_mh_or_triangle_flag==MH&&mmvd_flag[x0][y0]==0&& merge_subblock_flag[x0][y0]==0&&(cbWidth*cbHeight)>=64&&cbWidth<128&&cbHeight<128){
AND
if (use_mh_or_triangle_flag==TRIANGLE&&slice_type==B&&cbWidth*cbHeight>=64&&merge_subblock_flag[x0][y0]==0&&mmvd_flag[x0][y0]==0&& mh_intra_flag[x0][y0]==0)

where, use_mh_or_triangle_flag may equal one of MH or TRIANGLE.

In one example, according to the techniques herein, triangle mode signaling is mirrored in for the non-skip/non-merge branch. This allows the use of triangle prediction when non-skip/non-merge mode is used, which may improve coding efficiency. It should be noted that non-skip/non-merge may also be referred to as the AMVP branch. Table 11 illustrates an example where the triangle mode signaling is mirrored in the non-skip/non-merge branch compared to the syntax in Table 6.

TABLE 11

|  | Descriptor |
|---|---|
| coding_unit( x0, y0, cbWidth, cbHeight, treeType ) { | |
| ... | |
|   } else {/* MODE_INTER */ | |
|     if( cu_skip_flag[ x0 ][ y0 ] ) { | |
|     ... | |
|     } else { | |
|       merge_flag[ x0 ][ y0 ] | ae(v) |
|       if( merge_flag[ x0 ][ y0 ] ) { | |
|       ... | |
|       } else { | |
|         if( slice_type = = B ) | |
|           inter_pred_idc[ x0 ][ y0 ] | ae(v) |
|         if( sps_affine_enabled_flag && cbWidth >=16 && cbHeight >= 16 ) { | |
|           inter_affine_flag[ x0 ][ y0 ] | ae(v) |
|           if( sps_affine_type_flag && inter_affine_flag[ x0 ][ y0 ] ) | |
|             cu_affine_type_flag[ x0 ][ y0 ] | ae(v) |
|         } | |
|         if( inter_pred_idc[ x0 ][ y0 ] != PRED_L1 ) { | |
|           if( num_ref_idx_l0_active_minus1 > 0 ) | |
|             ref_idx_l0[ x0 ][ y0 ] | ae(v) |
|           mvd_coding( x0, y0, 0, 0 ) | |
|           if( MotionModelIdc[ x0 ][ y0 ] > 0 ) | |
|             mvd_coding( x0, y0, 0, 1 ) | |
|           if(MotionModelIdc[ x0 ][ y0 ] > 1 ) | |
|             mvd_coding( x0, y0, 0, 2 ) | |
|           mvp_l0_flag[ x0 ][ y0 ] | ae(v) |
|         } else { | |
|           MvdL0[ x0 ][ y0 ][ 0 ] = 0 | |
|           MvdL0[ x0 ][ y0 ][ 1 ] = 0 | |
|         } | |
|         if( inter_pred_idc[ x0 ][ y0 ] != PRED_L0 ) { | |
|           if( num_ref_idx_l1_active_minus1 > 0 ) | |
|             ref_idx_l1[ x0 ][ y0 ] | ae(v) |
|           if( mvd_l1_zero_flag && inter_pred_idc[ x0 ][ y0 ] = = PRED_BI ) { | |
|             MvdL1[ x0 ][ y0 ][ 0 ] = 0 | |
|             MvdL1[ x0 ][ y0 ][ 1 ] = 0 | |
|             MvdCpL1[ x0 ][ y0 ][ 0 ][ 0 ] = 0 | |
|             MvdCpL1[ x0 ][ y0 ][ 0 ][ 1 ] = 0 | |
|             MvdCpL1[ x0 ][ y0 ][ 1 ][ 0 ] = 0 | |
|             MvdCpL1[ x0 ][ y0 ][ 1 ][ 1 ] = 0 | |
|             MvdCpL1[ x0 ][ y0 ][ 2 ][ 0 ] = 0 | |
|             MvdCpL1[ x0 ][ y0 ][ 2 ][ 1 ] = 0 | |
|           } else { | |
|             mvd_coding( x0, y0, 1, 0 ) | |
|           if( MotionModelIdc[ x0 ][ y0 ] > 0 ) | |
|             mvd_coding( x0, y0, 1, 1 ) | |
|           if(MotionModelIdc[ x0 ][ y0 ] > 1 ) | |
|             mvd_coding( x0, y0, 1, 2 ) | |
|           mvp_l1_flag[ x0 ][ y0 ] | ae(v) |
|         } else { | |
|           MvdL1[ x0 ][ y0 ][ 0 ] = 0 | |
|           MvdL1[ x0 ][ y0 ][ 1 ] = 0 | |
|         } | |
|         if( sps_amvr_enabled_flag && inter_affine_flag = = 0 && ( MvdL0[ x0 ][ y0 ][ 0 ] != 0 | | MvdL0[ x0 ][ y0 ][ 1 ] != 0 | | MvdL1[ x0 ][ y0 ][ 0 ] != 0 | | MvdL1[ x0 ][ y0 ][ 1 ] != 0 ) ) | |

TABLE 11-continued

| | Descriptor |
|---|---|
| amvr_mode[ x0 ][ y0 ]<br>    if( sps_triangle_mode_flag && inter_pred_idc[ x0 ][ y0 ] = =<br>PRED_BI && cbWidth*cbHeight >= 64 ) | ae(v) |
|         triangle_mode_flag[ x0 ][ y0 ] // motion vectors used for each part<br>will the ones explicitly signaled. There may be a ordering part0 uses List0 and part1<br>uses List1 motion vector. No triangle_merge_index syntax element needs to be<br>signaled in this part of the syntax<br>    if( sps_gbi_enabled_flag && inter_pred_idc[ x0 ][ y0 ] = =<br>PRED_BI &&<br>      cbWidth * cbHeight >= 256 ) | ae(v) |
|         gbi_idx[ x0 ][ y0 ]<br>      }<br>    }<br>  }<br>  if( !pcm_flag[ x0 ][ y0 ] ) {<br>    if( CuPredMode[ x0 ][ y0 ] != MODE_INTRA &&<br>cu_skip_flag[ x0 ] [ y0 ] = = 0 ) | ae(v) |
|       cu_cbf<br>    if( cu_cbf )<br>      transform_tree( x0, y0, cbWidth, cbHeight, treeType )<br>  }<br>} | ae(v) |

With respect to Table 11, the definitions of the respective syntax elements may be as provided above.

With respect to Table 6, at present the triangle merge list construction process is separate from the sub-block merge list construction process and the non-sub-block merge list construction process. In one example, according to the techniques herein, the non-sub-block merge list may be used as the merge list for triangle mode. In the case where such a selection is made then it may be acceptable to make triangle merge index binarization the same as other (e.g., non-sub block) merge index binarization. When the binarization is the same, in one example, the context selected for entropy coding the triangle merge index may be different from the context of the non-sub-block merge index. In one example non-sub-block merge index refers to the syntax element merge_idx[x0][y0]. In one example, triangle merge index refers to syntax element triangle_merge_idx[x0][y0]

In one example, according to the techniques herein, syntax may be modified to signal the flag mh_intra_flag[x0][y0] after the flag triangle_mode_flag[x0][y0] when triangle_mode_flag[x0][y0] is equal to 0 and not signal the flag mh_intra_flag[x0][y0] after the flag triangle_mode_flag[x0][y0] when triangle_mode_flag[x0][y0] is equal to 1. In one example, when not present the value of multi-hypothesis flag is inferred to 0. Table 12 illustrates an example where the flag mh_intra_flag[x0][y0] is conditional present after the flag triangle_mode_flag[x0][y0].

TABLE 12

| | Descriptor |
|---|---|
| coding_unit( x0, y0, cbWidth, cbHeight, treeType ) {<br>  ...<br>  mmvd_flag[ x0 ][ y0 ]<br>  if ( mmvd_flag[ x0 ][ y0 ] = = 0 && MaxNumSubblockMergeCand > 0<br>&& cbWidth >= 8 && cbHeight >= 8 ) | ae(v) |
|     merge_subblock_flag[ x0 ][ y0 ]<br>  if ( sps_triangle_mode_flag && slice_type == B && cbWidth*cbHeight >=<br>64 && merge_subblock_flag[ x0 ][ y0 ] = = 0 && mmvd_flag[ x0 ][ y0 ] = = 0 ) | ae(v) |
|     triangle_mode_flag[ x0 ][ y0 ]<br>  if( triangle_mode[ x0 ][ y0 ] = = 0 &&<br>    mmvd_flag[ x0 ][ y0 ] = = 0 && merge_subblock_flag[ x0 ][ y0 ]<br>= = 0 &&<br>    ( cbWidth * cbHeight ) >= 64 && cbWidth < 128 && cbHeight <<br>128 ) { | ae(v) |
|     mh_intra_flag[ x0 ][ y0 ]<br>    if( mh_intra_flag[ x0 ][ y0 ] ) { | ae(v) |
|       mh_intra_luma_mpm_flag[ x0 ][ y0 ]<br>      if( mh_intra_luma_mpm_flag[ x0 ][ y0 ] ) | ae(v) |
|         mh_intra_luma_mpm_idx[ x0 ][ y0 ]<br>    }<br>  }<br>  ... | ae(v) |

With respect to Table 12, the definitions of the respective syntax elements may be as provided above.

In one example, according to the techniques herein, triangle_mode_flag[x0][y0] may be used to indicate motion information (e.g., (MV0, refIdx0), (MV1, refIdx1), InterDir and MMVD data) to be used in triangle mode processing. With respect to Table 6, at present triangle mode makes use of motion information in a merge list. In one example, with the addition of MMVD, the motion information in the merge list can be further modified. In one example, it may be effective to have triangle mode use this modified motion information instead of the motion information directly from the merge list. This would effectively allow the tools to work together. In one example, to enable such an approach, triangle mode would not have its own merge list, but use the merge list and MMVD signaling for non-sub-block mode. Table 13 illustrates an example where triangle mode would not have its own merge list, but uses the merge list and MMVD signaling for non-sub-block mode, according to the techniques herein.

TABLE 13

|  | Descriptor |
|---|---|
| coding_unit( x0, y0, cbWidth, cbHeight, treeType ) { | |
| ... | |
|     } | |
|   } | |
|   if ( sps_triangle_mode_flag && slice_type == B && cbWidth*cbHeight >= 64 && merge_subblock_flag[ x0 ][ y0 ] = = 0 ) | |
|     triangle_mode_flag[ x0 ][ y0 ] | ae(v) |
|   if ( cu_skip_flag[ x0 ][ y0 ] \|\| merge_flag[ x0 ][ y0 ] { | |
|     if( mmvd_flag[ x0 ][ y0 ] = = 1 ) { | |
|       mmvd_merge_flag[ x0 ][ y0 ] | ae(v) |
|       mmvd_distance_idx[ x0 ][ y0 ] | ae(v) |
|       mmvd_direction_idx[ x0 ][ y0 ] | ae(v) |
|     } else { | |
|       else( merge_subblock_flag[ x0 ][ y0 ] = = 0 && MaxNumMergeCand > 1 ) | |
|         merge_idx[ x0 ][ y0 ] | ae(v) |
|       if( merge_subblock_flag[ x0 ][ y0 ] = = 1 && MaxNumSubblockMergeCand > 1 ) | |
|         merge_subblock_idx[ x0 ][ y0 ] | ae(v) |
|     } | |
|   } | |
| ... | |

With respect to Table 13, the definitions of the respective syntax elements may be as provided above.

Referring again to FIG. 6, as illustrated in FIG. 6, inter prediction processing unit 214 may receive reconstructed video block via filter unit 216, which may be part of an in-loop filtering process. Filter unit 216 may be configured to perform deblocking and/or Sample Adaptive Offset (SAO) filtering. Deblocking refers to the process of smoothing the boundaries of reconstructed video blocks (e.g., make boundaries less perceptible to a viewer). SAO filtering is a non-linear amplitude mapping that may be used to improve reconstruction by adding an offset to reconstructed video data. Entropy encoding unit 218 receives quantized transform coefficients and predictive syntax data (e.g., intra prediction data, motion prediction data, QP data, etc.). Entropy encoding unit 218 may be configured to perform entropy encoding according to one or more of the techniques described herein. Entropy encoding unit 218 may be configured to output a compliant bitstream (e.g., a bitstream) that a video decoder can receive and reproduce video data therefrom. In this manner, video encoder 200 represents an example of a device configured to determine whether sub-block based inter prediction parameters for a current video block are inferred from neighboring blocks, signal a flag specifying whether sub-block based inter prediction parameters for a current video block are inferred from neighboring blocks, and conditionally signal a flag specifying whether a merge mode with motion vector difference values is used to generate inter prediction parameters of the current video block based on the value of the flag specifying whether sub-block based inter prediction parameters for a current video block are inferred from neighboring blocks.

Figure 7:
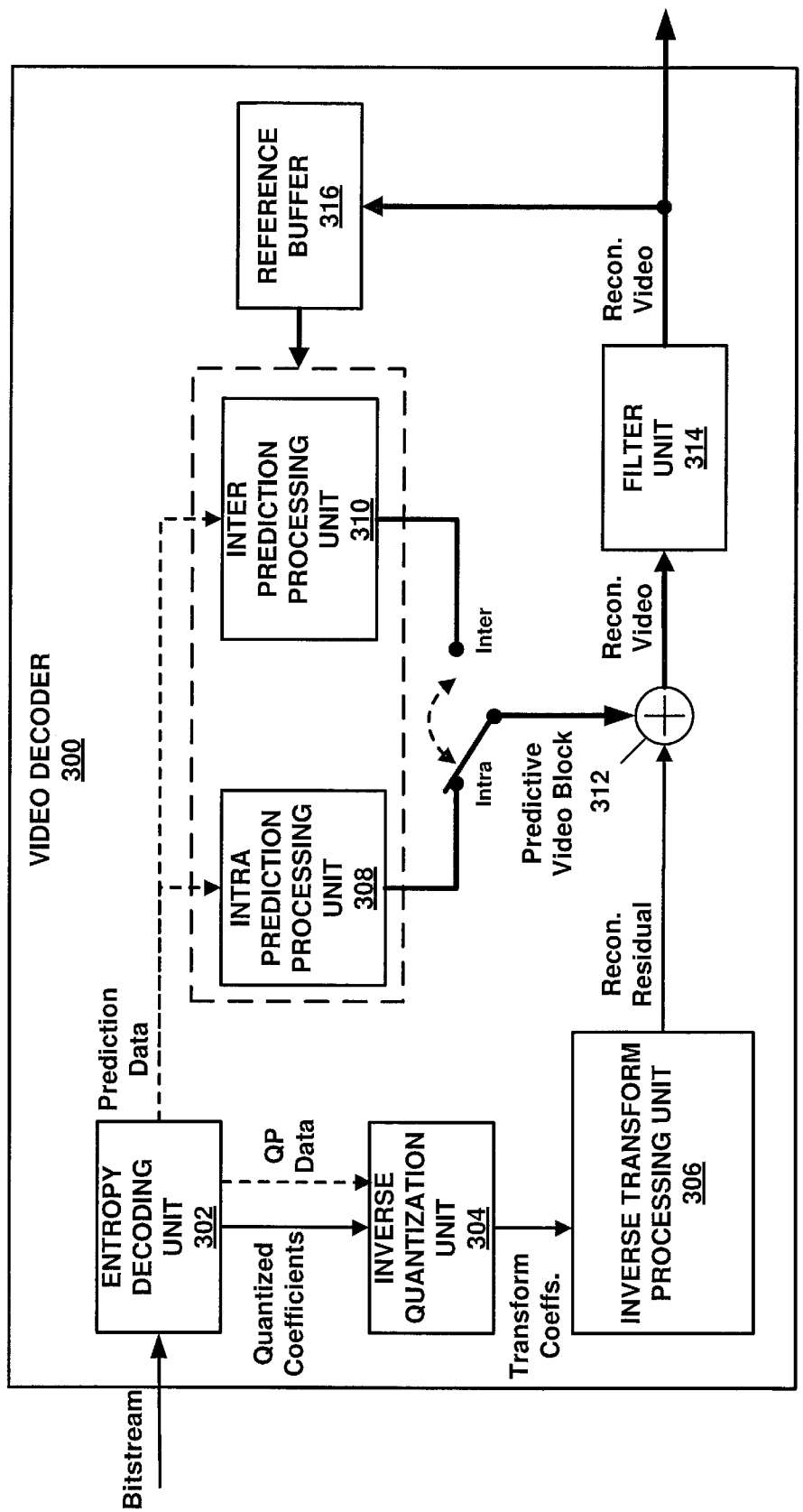
FIG. 7 is a block diagram illustrating an example of a video decoder that may be configured to decode video data, in accordance with one or more techniques of this disclosure.

FIG. 7 is a block diagram illustrating an example of a video decoder that may be configured to decode video data, according to one or more techniques of this disclosure. In one example, video decoder 300 may be configured to reconstruct video data based on one or more of the techniques described above. That is, video decoder 300 may operate in a reciprocal manner to video encoder 200 described above. Video decoder 300 may be configured to perform intra prediction decoding and inter prediction decoding and, as such, may be referred to as a hybrid decoder. In the example illustrated in FIG. 7 video decoder 300 includes an entropy decoding unit 302, inverse quantization unit 304, inverse transformation processing unit 306, intra prediction processing unit 308, inter prediction processing unit 310, summer 312, filter unit 314, and reference buffer 316. Video decoder 300 may be configured to decode video data in a manner consistent with a video encoding system, which may implement one or more aspects of a video coding standard. It should be noted that although example video decoder 300 is illustrated as having distinct functional blocks, such an illustration is for descriptive purposes and does not limit video decoder 300 and/or sub-components thereof to a particular hardware or software architecture. Functions of video decoder 300 may be realized using any combination of hardware, firmware, and/or software implementations.

As illustrated in FIG. 7, entropy decoding unit 302 receives an entropy encoded bitstream. Entropy decoding unit 302 may be configured to decode quantized syntax elements and quantized coefficients from the bitstream according to a process reciprocal to an entropy encoding process. Entropy decoding unit 302 may be configured to perform entropy decoding according any of the entropy coding techniques described above. Entropy decoding unit 302 may parse an encoded bitstream in a manner consistent with a video coding standard. Video decoder 300 may be configured to parse an encoded bitstream where the encoded bitstream is generated based on the techniques described above. Inverse quantization unit 304 receives quantized transform coefficients (e.g., level values) and quantization parameter data from entropy decoding unit 302. Quantization parameter data may include any and all combinations of delta QP values and/or quantization group size values and the like described above. Video decoder 300 and/or inverse quantization unit 304 may be configured to determine QP values used for inverse quantization based on values signaled by a video encoder and/or through video properties and/or coding parameters. That is, inverse quantization unit 304 may operate in a reciprocal manner to coefficient quantization unit 206 described above. Inverse quantization unit 304 may be configured to apply an inverse quantization. Inverse transform processing unit 306 may be configured to perform an inverse transformation to generate reconstructed residual data. The techniques respectively performed by inverse quantization unit 304 and inverse transform processing unit 306 may be similar to techniques performed by inverse quantization/transform processing unit 208 described above. Inverse transform processing unit 306 may be configured to apply an inverse DCT, an inverse DST, an inverse integer transform, Non-Separable Secondary Transform (NSST), or a conceptually similar inverse transform processes to the transform coefficients in order to produce residual blocks in the pixel domain. Further, as described above, whether a particular transform (or type of particular transform) is performed may be dependent on an intra prediction mode. As illustrated in FIG. 7, reconstructed residual data may be provided to summer 312. Summer 312 may add reconstructed residual data to a predictive video block and generate reconstructed video data.

As described above, a predictive video block may be determined according to a predictive video technique (e.g., intra-frame prediction and inter-frame prediction). Intra prediction processing unit 308 may be configured to receive intra prediction syntax elements and retrieve a predictive video block from reference buffer 316. Reference buffer 316 may include a memory device configured to store one or more frames of video data. Intra prediction syntax elements may identify an intra prediction mode, such as the intra prediction modes described above. In one example, intra prediction processing unit 308 may reconstruct a video block using according to one or more of the intra prediction coding techniques described herein. Inter prediction processing unit 310 may receive inter prediction syntax elements and generate motion vectors to identify a prediction block in one or more reference frames stored in reference buffer 316. Inter prediction processing unit 310 may produce motion compensated blocks, possibly performing interpolation based on interpolation filters. Identifiers for interpolation filters to be used for motion estimation with sub-pixel precision may be included in the syntax elements. Inter prediction processing unit 310 may use interpolation filters to calculate interpolated values for sub-integer pixels of a reference block.

As described above, video decoder 300 may parse an encoded bitstream where the encoded bitstream is generated based on the techniques described above and as described above, video encoder 200 may generate a bitstream according to the motion vector prediction techniques described above. Thus, video decoder 300 may be configured to perform motion vector prediction according to techniques described above. In this manner video decoder 300 represents an example of a device configured to parse a flag specifying whether sub-block based inter prediction parameters for a current video block are inferred from neighboring blocks, and conditionally parse a flag specifying whether a merge mode with motion vector difference values is used to generate inter prediction parameters of the current video block based on the value of the parsed flag specifying whether sub-block based inter prediction parameters for a current video block are inferred from neighboring blocks.

Referring again to FIG. 7, filter unit 314 may be configured to perform filtering on reconstructed video data. For example, filter unit 314 may be configured to perform deblocking and/or SAO filtering, as described above with respect to filter unit 216. Further, it should be noted that in some examples, filter unit 314 may be configured to perform proprietary discretionary filter (e.g., visual enhancements). As illustrated in FIG. 7 a reconstructed video block may be output by video decoder 300.

In one or more examples, the functions described may be implemented in hardware, software, firmware, or any combination thereof If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can include RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

Instructions may be executed by one or more processors, such as one or more digital signal processors (DSPs), general-purpose microprocessors, application-specific integrated circuits (ASICs), field-programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Moreover, each functional block or various features of the base station device and the terminal device used in each of the aforementioned embodiments may be implemented or executed by a circuitry, which is typically an integrated circuit or a plurality of integrated circuits. The circuitry designed to execute the functions described in the present specification may include a general-purpose processor, a digital signal processor (DSP), an application-specific or general-application integrated circuit (ASIC), a field-programmable gate array (FPGA), or other programmable logic devices, discrete gates or transistor logic, or a discrete hardware component, or a combination thereof. The general-purpose processor may be a microprocessor, or alternatively, the processor may be a conventional processor, a controller, a microcontroller or a state machine. The general-purpose processor or each circuit described above may be configured by a digital circuit or may be configured by an analogue circuit. Further, when a technology of making into an integrated circuit superseding integrated circuits at the present time appears due to advancement of a semiconductor technology, the integrated circuit by this technology is also able to be used.

Various examples have been described. These and other examples are within the scope of the following claims.

What is claimed is:

1. A non-transitory computer-readable medium of a device storing one or more computer-executable instructions that, when executed by one or more processors of the device, cause the device to:
   decode a merge subblock flag that specifies whether subblock-based inter prediction parameters for a coding unit are inferred from neighboring blocks and that determines whether a motion vector difference merge flag and a combination flag are to be decoded;
   determine a value of the merge subblock flag;
   decode the motion vector difference merge flag after the value of the merge subblock flag is determined as being equal to zero and a value of a motion vector difference flag is determined as being equal to one; and
   decode the combination flag that specifies whether a combined inter-picture merge and intra-picture prediction is applied to the coding unit by using the merge subblock flag and a sequence parameter set (SPS) flag for the combined inter-picture merge and intra-picture prediction,
   wherein:
   the motion vector difference merge flag specifies that a prediction parameter with a motion vector difference is used, and
   the motion vector difference flag specifies whether a merge mode with motion vector difference (MMVD) mode is enabled.

2. The non-transitory computer-readable medium of claim 1, wherein the one or more computer-executable instructions, when executed by the one or more processors, further cause the device to:
   decode the combination flag that specifies whether the combined inter-picture merge and intra-picture prediction is applied to the coding unit after the value of the merge subblock flag is determined as being equal to zero and the SPS flag for the combined inter-picture merge and intra-picture prediction is determined as being equal to one.

3. A device comprising:
   one or more processors; and
   one or more non-transitory computer-readable media coupled to the one or more processors and storing one or more computer-executable instructions that, when executed by at least one of the one or more processors, cause the device to:
   code a merge subblock flag that specifies whether subblock-based inter prediction parameters for a coding unit are inferred from neighboring blocks and that determines whether a motion vector difference merge flag and a combination flag are to be coded;
   code the motion vector difference merge flag after a value of the merge subblock flag is determined as being equal to zero and a value of a motion vector difference flag is determined as being equal to one; and
   code the combination flag that specifies whether a combined inter-picture merge and intra-picture prediction is applied to the coding unit by using the merge subblock flag and a sequence parameter set (SPS) flag for the combined inter-picture merge and intra-picture prediction,
   wherein:
   the motion vector difference merge flag specifies that a prediction parameter with a motion vector difference is used, and
   the motion vector difference flag specifies whether a merge mode with motion vector difference (MMVD) mode is enabled.

4. The device of claim 3, wherein the one or more computer-executable instructions, when executed by the at least one of the one or more processors, further cause the device to:
   code the combination flag that specifies whether the combined inter-picture merge and intra-picture prediction is applied to the coding unit after the value of the merge subblock flag is determined as being equal to zero and the SPS flag for the combined inter-picture merge and intra-picture prediction is determined as being equal to one.

* * * * *